United States Patent
Maeda et al.

(10) Patent No.: US 12,418,501 B2
(45) Date of Patent: Sep. 16, 2025

(54) INFORMATION PROCESSING APPARATUS, INFORMATION PROCESSING METHOD, TERMINAL DEVICE, AND DISPLAY METHOD

(71) Applicant: SONY GROUP CORPORATION, Tokyo (JP)

(72) Inventors: Yoshinori Maeda, Tokyo (JP); Yasuharu Asano, Tokyo (JP); Keiichi Yamada, Tokyo (JP); Akira Inoue, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/554,383

(22) PCT Filed: Feb. 24, 2022

(86) PCT No.: PCT/JP2022/007572
§ 371 (c)(1),
(2) Date: Oct. 6, 2023

(87) PCT Pub. No.: WO2022/224584
PCT Pub. Date: Oct. 27, 2022

(65) Prior Publication Data
US 2024/0380722 A1 Nov. 14, 2024

(30) Foreign Application Priority Data
Apr. 22, 2021 (JP) ................. 2021-072658

(51) Int. Cl.
*H04L 51/216* (2022.01)
*G06F 40/279* (2020.01)
*H04L 12/18* (2006.01)

(52) U.S. Cl.
CPC .......... *H04L 51/216* (2022.05); *G06F 40/279* (2020.01); *H04L 12/1822* (2013.01)

(58) Field of Classification Search
CPC .................. H04L 51/216; H04L 12/1822
See application file for complete search history.

(56) References Cited

U.S. PATENT DOCUMENTS 6,346,952 B1 * 2/2002 Shtivelman ........... G06F 16/345
707/999.005
7,478,129 B1 * 1/2009 Chemtob ............ H04L 65/4038
709/204

(Continued)

FOREIGN PATENT DOCUMENTS

EP 4322090 A1 2/2024
JP 2013-205971 A 10/2013

(Continued)

OTHER PUBLICATIONS

International Search Report and Written Opinion of PCT Application No. PCT/JP2022/007572, issued on May 24, 2022, 09 pages of ISRWO.

(Continued)

*Primary Examiner* — David R Lazaro
(74) *Attorney, Agent, or Firm* — CHIP LAW GROUP

(57) ABSTRACT

Provided is an information processing apparatus that includes an acquisition unit that acquires group content information regarding a content of a conversation in at least one or more groups among a plurality of groups in which a plurality of users participating in a remote meeting are divided and can have a conversation in each group, and an output unit that outputs plural group list information that displays the group content information in association with a corresponding group together with the plurality of groups.

19 Claims, 21 Drawing Sheets

(56) References Cited

U.S. PATENT DOCUMENTS

| | | | | |
|---|---|---|---|---|
| 9,456,010 | B1* | 9/2016 | Abraham | H04M 3/564 |
| 10,581,764 | B1* | 3/2020 | Ledet | H04L 51/04 |
| 10,992,488 | B2* | 4/2021 | Le | H04L 51/52 |
| 11,855,793 | B2* | 12/2023 | Christensen | G06F 3/048 |
| 12,177,526 | B2* | 12/2024 | Panchaksharaiah | H04N 21/4788 |
| 2007/0174407 | A1* | 7/2007 | Chen | G06Q 10/10 709/207 |
| 2011/0069643 | A1* | 3/2011 | Yoakum | H04L 65/4015 370/261 |
| 2012/0182384 | A1* | 7/2012 | Anderson | H04N 7/157 348/14.09 |
| 2013/0262466 | A1* | 10/2013 | Mayumi | G09B 7/02 707/737 |
| 2017/0078233 | A1* | 3/2017 | Cook | H04L 51/216 |
| 2018/0033332 | A1* | 2/2018 | Nelson | G06Q 10/107 |
| 2018/0181854 | A1* | 6/2018 | Koukoumidis | G06N 3/006 |
| 2018/0218458 | A1* | 8/2018 | Benfield | G06F 16/41 |
| 2019/0007228 | A1* | 1/2019 | Vuskovic | G06Q 10/00 |
| 2019/0058608 | A1* | 2/2019 | Manuel-Devadoss | H04L 51/52 |
| 2020/0092519 | A1* | 3/2020 | Shin | G10L 17/00 |
| 2020/0302812 | A1 | 9/2020 | Williams | |
| 2021/0076002 | A1 | 3/2021 | Peters | |
| 2021/0334473 | A1* | 10/2021 | Trehan | H04L 51/04 |
| 2021/0390144 | A1* | 12/2021 | B M S | H04L 65/1093 |
| 2022/0108276 | A1* | 4/2022 | Stringham | G06F 9/451 |
| 2022/0108413 | A1* | 4/2022 | Hack | G06Q 50/20 |
| 2022/0310085 | A1* | 9/2022 | Patil | G06F 16/245 |
| 2022/0329556 | A1* | 10/2022 | Daga | H04L 51/23 |
| 2024/0380722 | A1* | 11/2024 | Maeda | G06F 40/279 |

FOREIGN PATENT DOCUMENTS

| | | |
|---|---|---|
| JP | 2014137706 A | 7/2014 |
| JP | 2014-191355 A | 10/2014 |
| JP | 2019-168551 A | 10/2019 |

OTHER PUBLICATIONS

"Use breakout rooms in Teams meetings", Microsoft Corporation, Apr. 15, 2021, 08 pages.

Calacci Dan et al: "Breakout: An Open Measurement and Intervention Tool for Distributed Peer Learning Groups", , Jul. 6, 2016 (Jul. 6, 2016), XP093197647.

\* cited by examiner

FIG.6

| GROUP ID | GROUP CONTENT INFORMATION | MEMBER | ... |
|---|---|---|---|
| GP1 | SM1 | A-1 | ... |
| | | A-2 | ... |
| | | A-3 | ... |
| | | A-4 | ... |
| | | ... | ... |
| GP2 | SM2 | ... | ... |
| ... | ... | ... | ... |

| KEYWORD | SUMMARY CONTENT | CASE EXAMPLE OF COMMENTS |
|---|---|---|
| HOLDING POSTPONEMENT | IT IS DANGEROUS TO HOLD EVENT IN CORONA CRISIS SHOULD WE CONSIDER POSTPONEMENT? | LIST MERITS AND DEMERITS WHEN HOLDING |
| HOLDING | SUCCESSFULLY INVITED AND DECIDED TO HOLD | WHAT IS IMPORTANT IF YOU ARE IN MANAGEMENT POSITION? |
| POSTPONEMENT | IT WAS DECIDED TO POSTPONE DUE TO INCREASE IN NUMBER OF INFECTED PEOPLE | WHAT WAS NECESSARY NOT TO POSTPONE? |
| MEDICAL CARE | MEDICAL SITES ARE UNDER STRAIN | WHAT IS NEEDED TO SUPPORT? |
| ECONOMIC | GLOBAL ECONOMIC GROWTH IS DECLINING | WHAT FACTORS CAN BE CONSIDERED FOR ECONOMIC PROMOTION? |
| ... | ... | ... |

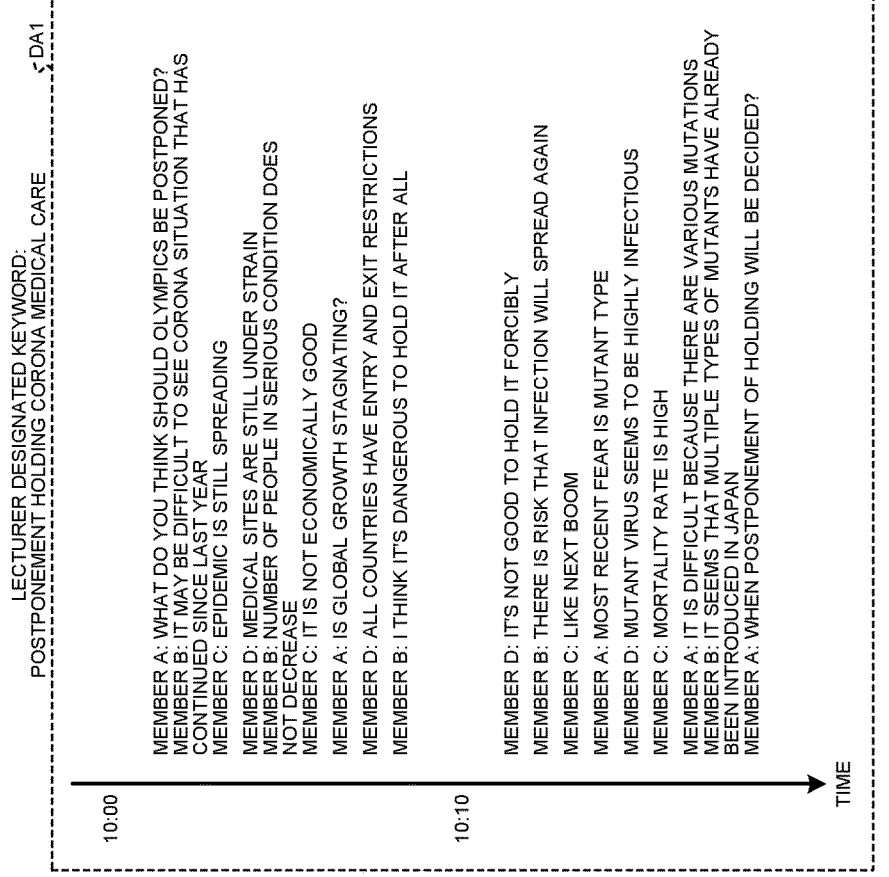
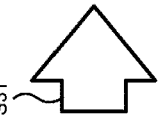
FIG.21

INFORMATION PROCESSING APPARATUS, INFORMATION PROCESSING METHOD, TERMINAL DEVICE, AND DISPLAY METHOD

FIELD

The present disclosure relates to an information processing apparatus, an information processing method, a terminal device, and a display method.

BACKGROUND

In recent years, a meeting (also referred to as a "remote meeting") by a plurality of users is performed remotely by communicating a voice or an image through the Internet, such as a web conference. Furthermore, a technology for dividing users participating in such a remote meeting into a plurality of groups is known (for example, Non Patent Literature 1).

CITATION LIST

Non Patent Literature

Non Patent Literature 1: "Use breakout rooms in Teams meetings", Microsoft Corporation <Internet> https://web.archive.org/web/20210122112205/https://support.microsoft.com/en-us/office/use-breakout-rooms-in-teams-meetings-7de1f48a-da07-466c-a5ab-4ebace28e461 (Searched on Apr. 15, 2021)

SUMMARY

Technical Problem

However, in the related art, it is not always possible to efficiently confirm information about the plurality of groups. In the related art, in order to grasp information such as a status of each group after division into the groups, it is necessary to enter and confirm the group, and thus it takes time and effort to confirm information of the plurality of groups. Therefore, it is desired to enable efficient confirmation of information on the plurality of groups.

Therefore, the present disclosure proposes an information processing apparatus, an information processing method, a terminal device, and a display method capable of efficiently confirming information on a plurality of groups.

Solution to Problem

According to the present disclosure, an information processing apparatus includes an acquisition unit that acquires group content information regarding a content of a conversation in at least one or more groups among a plurality of groups in which a plurality of users participating in a remote meeting are divided and can have a conversation in each group; and an output unit that outputs plural group list information that displays the group content information in association with a corresponding group together with the plurality of groups.

BRIEF DESCRIPTION OF DRAWINGS

FIG. 6 is a diagram illustrating an example of a group information storage unit according to an embodiment of the present disclosure.

FIG. 7 is a diagram illustrating an example of a history information storage unit according to an embodiment of the present disclosure.

FIG. 21 is a diagram illustrating an example of keywords and summary contents.

DESCRIPTION OF EMBODIMENTS

Hereinafter, embodiments of the present disclosure will be described in detail with reference to the drawings. Note that an information processing apparatus, an information processing method, a terminal device, and a display method according to the present application are not limited by the embodiments. Furthermore, in each of the following embodiments, the same parts are denoted by the same reference signs, and redundant description will be omitted.

The present disclosure will be described according to the following order of items shown below.

1. Embodiments
  1-1. Overview of information processing according to an embodiment of the present disclosure
    1-1-1. Display example of an entire remote lecture system
    1-1-2. Display example of a terminal device
    1-1-3. Background and effects
  1-2. Configuration of a remote lecture system according to an embodiment
  1-3. Configuration of an information processing apparatus according to an embodiment
  1-4. Configuration of a terminal device according to an embodiment
  1-5. Procedure of information processing according to an embodiment
    1-5-1. Procedure of processing related to an information processing apparatus
    1-5-2. Procedure of processing related to a group work
  1-6. Display example
    1-6-1. Distribution graph
    1-6-2. Frequency time series
    1-6-3. Radar chart
    1-6-4. Line graph
    1-6-5. Pie chart
    1-6-6. Bar graph
  1-7. Processing example
    1-7-1. Assist and comment examples
    1-7-2. Data example
    1-7-3. Group work setting example
  1-8. Operation example (line of sight)
  1-9. System example
2. Other embodiments
  2-1. Other configuration examples
  2-2. Others
3. Effects according to the present disclosure
4. Hardware configuration

1. EMBODIMENTS

Figure 1:
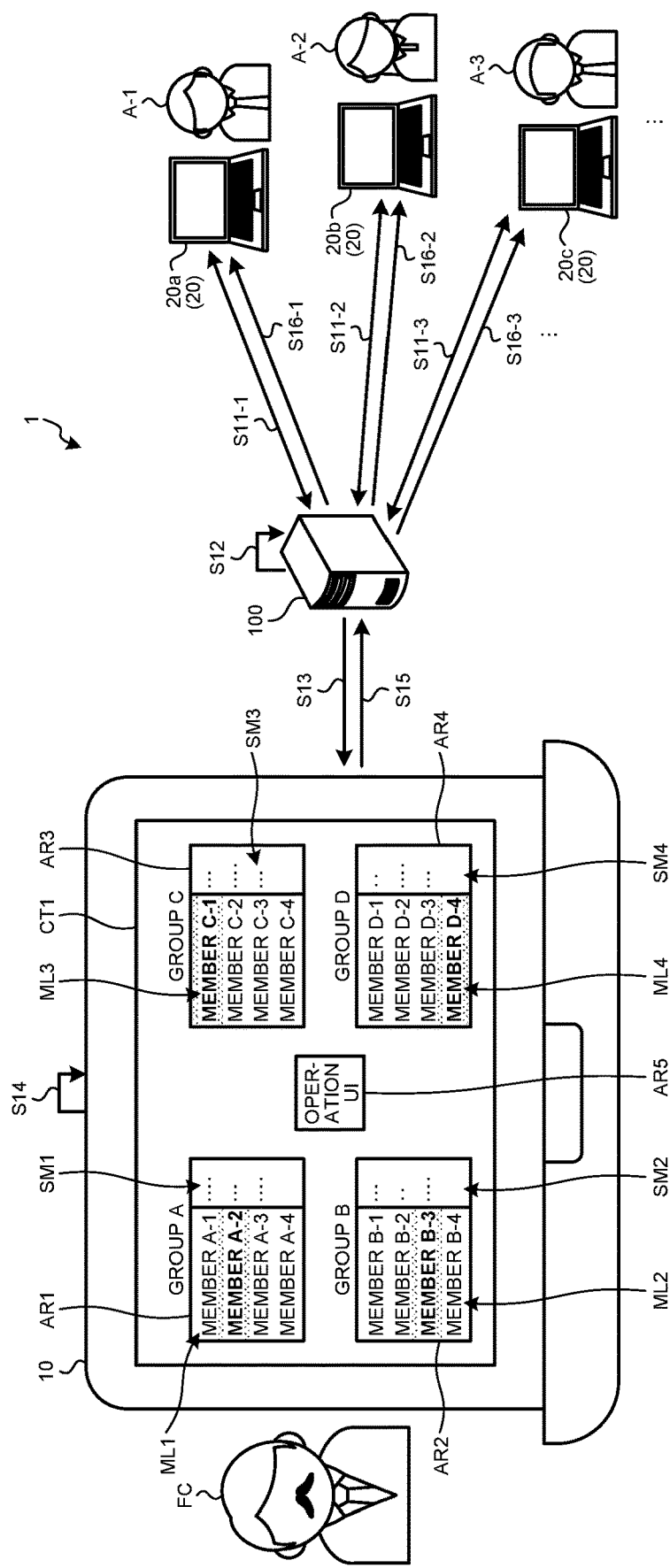
FIG. 1 is a diagram illustrating an example of information processing according to an embodiment of the present disclosure.

1-1. Overview of Information Processing According to an Embodiment of the Present Disclosure FIG. 1 is a diagram illustrating an example of information processing according to an embodiment of the present disclosure. The information processing according to the embodiment of the present disclosure is realized by a remote lecture system 1 including a remote meeting server 100, a terminal device 10, and a plurality of member terminals 20. In FIG. 1, in order to distinguish and describe each of the member terminals 20, each of the member terminals 20 may be described as a member terminal 20*a*, a member terminal 20*b*, and a member terminal 20*c*. Note that, in a case where the member terminal 20*a*, the member terminal 20*b*, the member terminal 20*c*, and the like are described without being particularly distinguished, they are described as "member terminal 20". Furthermore, although three member terminals 20 are illustrated in FIG. 1, there may be four or more member terminals 20.

First, an overview of a service related to a remote meeting provided by the remote lecture system 1 will be described with reference to FIG. 1. Note that detailed description of the same points as those of a remote meeting service such as a general web conference will be omitted as appropriate. The remote lecture system 1 has a function of dividing users (members) participating in a remote meeting (hereinafter also referred to as "meeting") into a plurality of groups and performing a group work. As described above, in the remote lecture system 1, a plurality of the users is assigned to each group, and it is possible to perform a group work such as discussion (conversation) and production among members belonging to each group. FIG. 1 illustrates a case where the plurality of users participating in a meeting is divided into a plurality of groups such as groups A to D and performs a group work.

For example, four users of members A-1, A-2, A-3, and A-4 belong to a group A, and four users of members B-1, B-2, B-3, and B-4 belong to a group B. Furthermore, a case where four users of members C-1, C-2, C-3, and C-4 belong to a group C, and four users of members D-1, D-2, D-3, and D-4 belong to a group D is illustrated. For example, in the remote lecture system 1, a host (an administrator) of a meeting such as a lecturer or a facilitator divides a plurality of the users participating in the meeting into a plurality of groups and sets a group work. Hereinafter, the lecturer FC will be described as an example of an administrator. In FIG. 1, the lecturer FC who is a lecturer of the meeting divides the plurality of members A-1 to D-4 and the like into the plurality of groups A to D using the terminal device 10, and sets a group work. Note that a setting example regarding the group work will be described later.

Hereinafter, a processing example illustrated in FIG. 1 will be described. Note that step numbers such as S11-1 illustrated in FIG. 1 are for describing each processing (signs) and do not indicate an order of processing, and each processing is executed at any time according to the progress of the remote meeting such as a group work.

Furthermore, in FIG. 1, the three members A-1, A-2, and A-3 are illustrated for the sake of explanation, but it is assumed that a large number of users (for example, 100, 1000, or the like) participate in a remote meeting provided by the remote lecture system 1 and are divided into groups. In FIG. 1, the member terminal 20 used by the member A-1 is described as a member terminal 20*a*, the member terminal 20 used by the member A-2 is described as a member terminal 20*b*, and the member terminal 20 used by the member A-3 is described as a member terminal 20*c*. An application (hereinafter, also referred to as a "remote meeting application") for participating in a remote meeting provided by the remote lecture system 1 is installed in each member terminal 20, and each user participates in the remote meeting using the remote meeting application.

In FIG. 1, the plurality of members A-1 to D-4 and the like are divided into the plurality of groups A to D, and work related to a group work such as discussion (conversation) in the group is performed in each group. In the group A, the members A-1, A-2, A-3, and A-4 have a conversation on the basis of, for example, a topic related to the Olympics. Furthermore, in the group B, the members B-1, B-2, B-3, and B-4 have a conversation on the basis of, for example, a topic related to the Olympics. In the groups C and D, similarly, the members belonging to the group have a conversation. Each member terminal 20 transmits and receives information regarding the remote meeting to and from the remote meeting server 100 as needed. Each member terminal 20 transmits information such as an utterance and an image of the user who uses the member terminal 20 to the remote meeting server 100, and receives information output for the remote meeting from the remote meeting server 100.

Between the remote meeting server 100 and the member terminal 20*a* used by the member A-1, communication (transmission/reception) of information regarding the remote meeting input/output by the member terminal 20*a* is performed (Step S11-1). For example, the member terminal 20*a* transmits information such as an utterance and an image of the member A-1 to the remote meeting server 100, and receives information output for the remote meeting from the remote meeting server 100. The member terminal 20*a* displays an intra-group screen CT11 (see FIG. 2) corresponding to the group A to which the member A-1 belongs, and voice-outputs utterances of other members in the group A. In this manner, each member terminal 20 displays or voice-outputs information regarding the group to which the member belongs.

Furthermore, between the remote meeting server 100 and the member terminal 20*b* used by the member A-2, communication (transmission/reception) of information regarding the remote meeting input/output by the member terminal 20*b* is performed (Step S11-2). For example, the member terminal 20*b* transmits information such as an utterance and an image of the member A-2 to the remote meeting server 100, and receives information output for the remote meeting from the remote meeting server 100. The member terminal 20*b* displays an intra-group screen corresponding to the group A to which the member A-2 belongs, and voice-outputs utterances of other members in the group A.

Furthermore, between the remote meeting server 100 and the member terminal 20*c* used by the member A-3, communication (transmission/reception) of information regarding the remote meeting input/output by the member terminal 20*c* is performed (Step S11-3). For example, the member terminal 20*c* transmits information such as an utterance and an image of the member A-3 to the remote meeting server 100, and receives information output for the remote meeting from the remote meeting server 100. The member terminal 20*b* displays an intra-group screen corresponding to the group A to which the member A-3 belongs, and voice-outputs utterances of other members in the group A. Note that similar processing is also executed in the member terminal 20 used by each member of the members A-4, B-1 to B-4, C-1 to C-4, and D-1 to D-4, but is not illustrated in FIG. 1.

For example, the member terminal 20 used by the member B-1 displays the intra-group screen CT21 (see FIG. 2) corresponding to the group B to which the member B-1 belongs, and voice-outputs the utterances of other members in the group B. Furthermore, for example, the member terminal 20 used by the member D-1 displays the intra-group screen CT41 (see FIG. 2) corresponding to the group B to which the member D-1 belongs, and voice-outputs the utterances of other members in the group D.

Hereinafter, in a case where Steps S11-1 to S11-3 are described without distinction, they are collectively referred to as Step S11. Step S11 is a step of performing communication (transmission and reception) of information regarding a remote meeting such as a group work between the remote meeting server 100 and each member terminal 20. Steps S11-1 to S11-3 are not limited to one time, and are executed as needed according to the progress of the remote meeting such as a group work.

The remote meeting server 100 executes processing of collecting information received from each member terminal 20 and generating plural group list information that displays group content information regarding a content of a conversation in each group in association with a corresponding group (Step S12). In FIG. 1, the remote meeting server 100 generates group content information SM1 of the group A on the basis of the utterance histories of the members A-1, A-2, A-3, and A-4. For example, the group content information SM1 may include information such as the number of appearances of each keyword in the conversation in the group A and the summary content of the conversation in the group A. However, the details will be described later.

Furthermore, the remote meeting server 100 generates group content information SM2 of the group B on the basis of the utterance histories of the members B-1, B-2, B-3, and B-4. The remote meeting server 100 generates the group content information SM3 of the group C on the basis of the utterance histories of the members C-1, C-2, C-3, and C-4. The remote meeting server 100 generates the group content information SM4 of the group D on the basis of the utterance histories of the members D-1, D-2, D-3, and D-4.

Then, the remote meeting server 100 generates plural group list information CT1 in which each of the group content information SM1 to SM4 is associated with the corresponding groups A to D. In FIG. 1, the remote meeting server 100 associates the member lists ML1 to ML4 of the groups A to D with the group content information SM1 to SM4, and generates the plural group list information CT1 arranged in the areas AR1 to AR4.

Then, the remote meeting server 100 transmits the plural group list information CT1 to the terminal device 10 (Step S13). The terminal device 10 that has received the plural-group list information CT1 from the remote meeting server 100 displays the plural-group list information CT1 (Step S14). In the plural group list information CT1, the member list ML1 indicating the members of the group A and the group content information SM1 are arranged in association with each other in the area AR1. Specifically, the member list ML1 is arranged in a left region (also referred to as a "first region") in the area AR1 of the plural group list information CT1, and the group content information SM1 is arranged in a right region (also referred to as a "second region") in the area AR1 of the plural group list information CT1. As described above, in the plural group list information CT1, the group content information SM1 of the group A is displayed in association with the member list ML1 of the group A.

The member list ML21 is arranged in the first region on the left side in the area AR2 of the plural group list information CT1, and the group content information SM2 is arranged in the second region on the right side in the area AR2 of the plural group list information CT1. As described above, in the plural group list information CT1, the group content information SM2 of the group B is displayed in association with the member list ML2 of the group B. Similarly, in the plural group list information CT1, the group content information SM3 of the group C is displayed in the area AR3 in association with the member list ML3 of the group C, and the group content information SM4 of the group D is displayed in the area AR4 in association with the member list ML4 of the group D. In this manner, the terminal device 10 displays the plural group list information CT1 indicating the group content information in association with the corresponding group.

As a result, the remote lecture system 1 can enable a lecturer, a facilitator, or the like who sets a group work such as a lecturer FC to efficiently confirm information on a plurality of groups.

Then, the terminal device 10 requests comment transmission to the member of the group A in response to the comment transmission operation to the member of the group A by the lecturer FC (Step S15). In FIG. 1, the lecturer FC requests the remote meeting server 100 to transmit a comment to the member of the group A by performing an operation on an operation user interface (UI) arranged in an area AR5 of the plural group list information CT1. For example, the terminal device 10 transmits comment transmission information including designation information indicating that the transmission destination of the comment is the group A and character information indicating the comment to be transmitted to the member of the group A to the remote meeting server 100 according to the operation by the lecturer FC. As a result, the terminal device 10 requests the remote meeting server 100 to transmit a comment to the member of the group A. Note that when requesting comment transmission, the lecturer FC may request comment transmission with reference to the assist information, which will be described later.

The remote meeting server 100 that has received the comment transmission information from the terminal device 10 transmits the comment indicated by the comment transmission information to the member terminal 20 of the member of the group A. For example, the remote meeting server 100 transmits the comment indicated by the comment transmission information to the member terminal 20a of the member A-1 (Step S16-1).

Furthermore, the remote meeting server 100 transmits the comment indicated by the comment transmission information to the member terminal 20b of the member A-2 (Step S16-2). The remote meeting server 100 transmits the comment indicated by the comment transmission information to the member terminal 20c of the member A-3 (Step S16-3). Similarly, the remote meeting server 100 transmits the comment indicated by the comment transmission information to the member terminal 20 of the member A-4.

When Steps S16-1 to S16-3 are described without distinction, they are collectively referred to as Step S16. Steps S16-1 to S16-3 are executed as needed at a timing when conditions are satisfied according to the progress of a remote meeting such as a group work. Furthermore, Step S16 may be performed together with Step S11. Furthermore, the comment may be transmitted not only to the members of the group A but also to the members of the groups B, C, and D, or may be collectively transmitted to all the members of the groups A to D.

As a result, in the remote lecture system 1, for example, a lecturer, a facilitator, or the like who sets a group work such as the lecturer FC can make a comment at a desired timing with respect to a group or the like in which a conversation is not active, and thus, it is possible to efficiently operate the group work.

1-1-1. Display Example of an Entire Remote Lecture System

Figure 2:
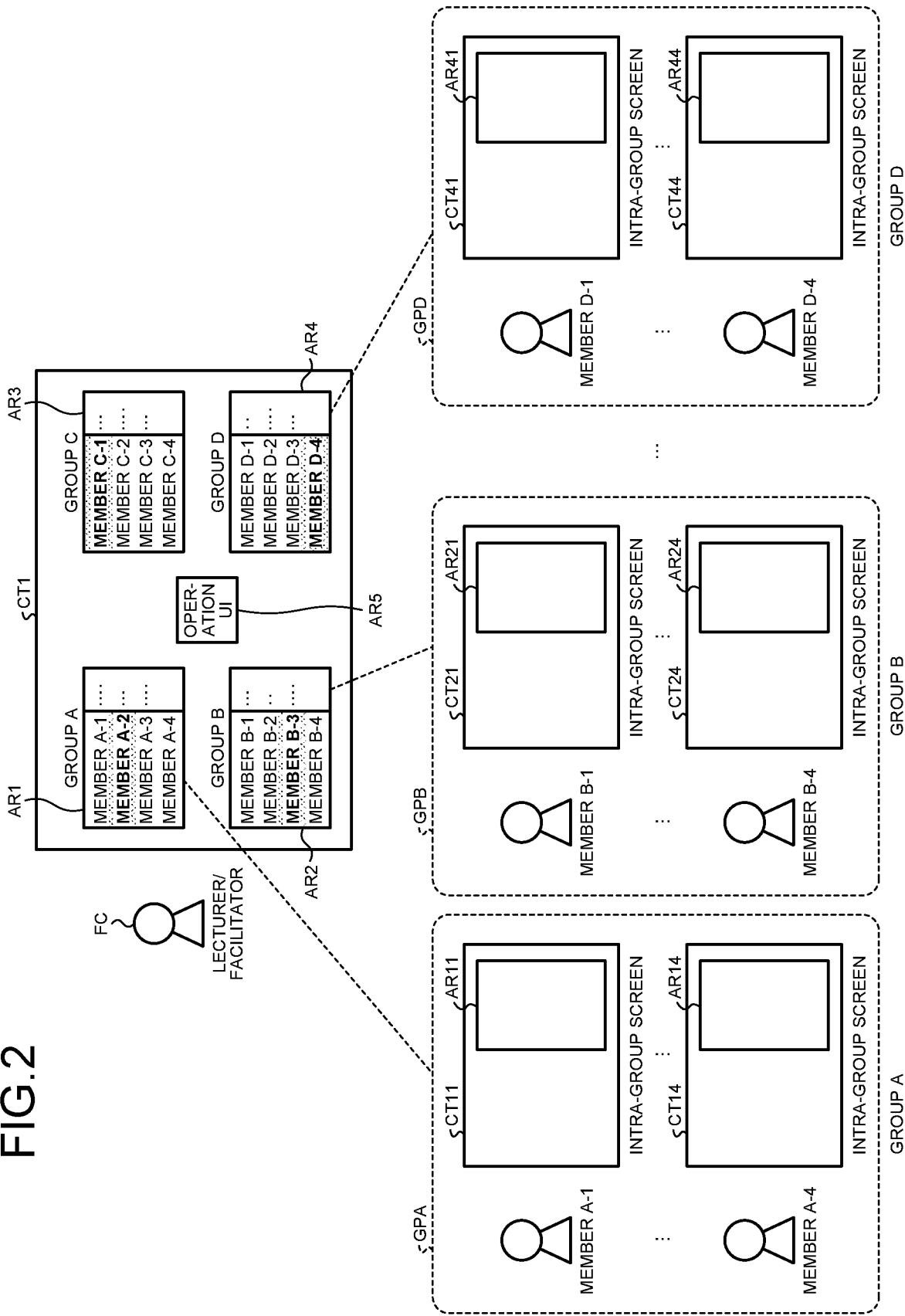
FIG. 2 is a diagram illustrating an example of display of an entire remote lecture system.

Hereinafter, various display examples in the remote lecture system 1 will be described with reference to FIGS. 2 and 3. First, an example of information displayed on each of the terminal device 10 used by the lecturer FC such as the lecturer and the facilitator and the member terminal 20 used by each member will be described with reference to FIG. 2. FIG. 2 is a diagram illustrating an example of display of the entire remote lecture system. Note that description of points similar to those in FIG. 1 will be omitted as appropriate.

The plural group list information CT1 illustrated in FIG. 2 is an overall grasp screen, is similar to the plural group list information CT1 of FIG. 1, and indicates the group content information in association with the corresponding group. The plural group list information CT1 is displayed on the terminal device 10 used by the lecturer FC such as the lecturer and the facilitator.

In the areas AR1 to AR4, information of each group is displayed. An area (first area) on the left side of each of the areas AR1 to AR4 is a member information display area, and a list of members belonging to the corresponding group is displayed. Furthermore, the terminal device 10 highlights the member who is speaking. The example of FIG. 2 illustrates a state in which a member A-2 is speaking in a group A, a member B-3 is speaking in a group B, a member C-1 is speaking in a group C, and a member D-42 is speaking in a group D.

An area (second area) on the right side of each of the areas AR1 to AR4 is a log information area of a corresponding group, and a keyword or summary information of a discussion content is displayed. For example, the group content information of the corresponding group is displayed in the second area of each of the areas AR1 to AR4.

Furthermore, the area AR5 is an operation UI area, and an interface for performing each operation, such as a button used when it is desired to send a comment to all groups, is arranged.

The group GPA illustrated in FIG. 2 indicates a group A to which the members A-1 to A-4 belong. The intra-group screen CT11 shows an intra-group screen corresponding to the group A displayed on the member terminal 20 used by the member A-1. Various types of information of the corresponding group such as member information and logs of the corresponding group are displayed on the intra-group screen. For example, an area AR11 of the intra-group screen CT11 is an utterance display area, and the content uttered by the member in the group A is displayed. Furthermore, an area other than the area AR11 of the intra-group screen CT11 is a material area, and a screen shared in the group A is displayed.

The intra-group screen CT14 indicates an intra-group screen corresponding to the group A displayed on the member terminal 20 used by the member A-4, and indicates the same content as the intra-group screen CT11. For example, an area AR14 of the intra-group screen CT14 is a remarks display area, and displays information similar to the area AR11 of the intra-group screen CT11. Furthermore, an area other than the area AR14 of the intra-group screen CT14 is a material area, and displays information similar to that of the intra-group screen CT11.

The group GPB illustrated in FIG. 2 indicates a group B to which the members B-1 to B-4 belong. The intra-group screen CT21 shows an intra-group screen corresponding to the group B displayed on the member terminal 20 used by the member B-1. For example, an area AR21 of the intra-group screen CT21 is an utterance display area, and the content uttered by the member in the group B is displayed. Furthermore, an area other than the area AR21 of the intra-group screen CT21 is a material area, and a screen shared in the group B is displayed.

The intra-group screen CT24 indicates an intra-group screen corresponding to the group B displayed on the member terminal 20 used by the member B-4, and indicates the same content as the intra-group screen CT21. For example, an area AR24 of the intra-group screen CT24 is a remarks display area, and displays information similar to the area AR21 of the intra-group screen CT21. Furthermore, an area other than the area AR24 of the intra-group screen CT24 is a material area, and displays information similar to that of the intra-group screen CT21.

The group GPD illustrated in FIG. 2 indicates a group D to which the members D-1 to D-4 belong. The intra-group screen CT41 shows an intra-group screen corresponding to the group D displayed on the member terminal 20 used by the member D-1. For example, an area AR41 of the intra-group screen CT41 is an utterance display area, and the content uttered by the member in the group D is displayed. Furthermore, an area other than the area AR41 of the intra-group screen CT41 is a material area, and a screen shared in the group D is displayed.

The intra-group screen CT44 indicates an intra-group screen corresponding to the group D displayed on the member terminal 20 used by the member D-4, and indicates the same content as the intra-group screen CT41. For example, an area AR44 of the intra-group screen CT44 is a remarks display area, and displays information similar to the area AR41 of the intra-group screen CT41. Furthermore, an area other than the area AR44 of the intra-group screen CT44 is a material area, and displays information similar to that of the intra-group screen CT41.

Note that the display example of FIG. 2 is merely an example, and any display mode can be adopted as the plural group list information CT1 as long as the entire group work can be grasped.

The remote lecture system 1 provides plural group list information CT1 which is an example of an overall grasp screen viewed by a lecturer or a facilitator, intra-group screens CT11 to CT44 which are examples of intra-group screens viewed by members of each group, and the like. As described above, the keywords extracted from the utterance information discussed in each group and the information summarizing the contents thereof are displayed on the overall grasp screen. Furthermore, the overall grasp screen also displays information indicating who of the members belonging to the group is expressing an opinion.

1-1-2. Display Example of a Terminal Device

Here, a display example on the terminal device 10 used by an administrator such as a lecturer or a facilitator will be described with reference to FIG. 3. FIG. 3 is a diagram illustrating an example of display to the administrator. FIG. 3 illustrates, as an example, a display on the terminal device 10 used by the lecturer FC for the group work for discussing the "2021 Olympics". Note that, in FIG. 3, the same points as those in FIGS. 1 and 2 are denoted by the same reference numerals, and the description thereof will be omitted as appropriate.

Figure 3:
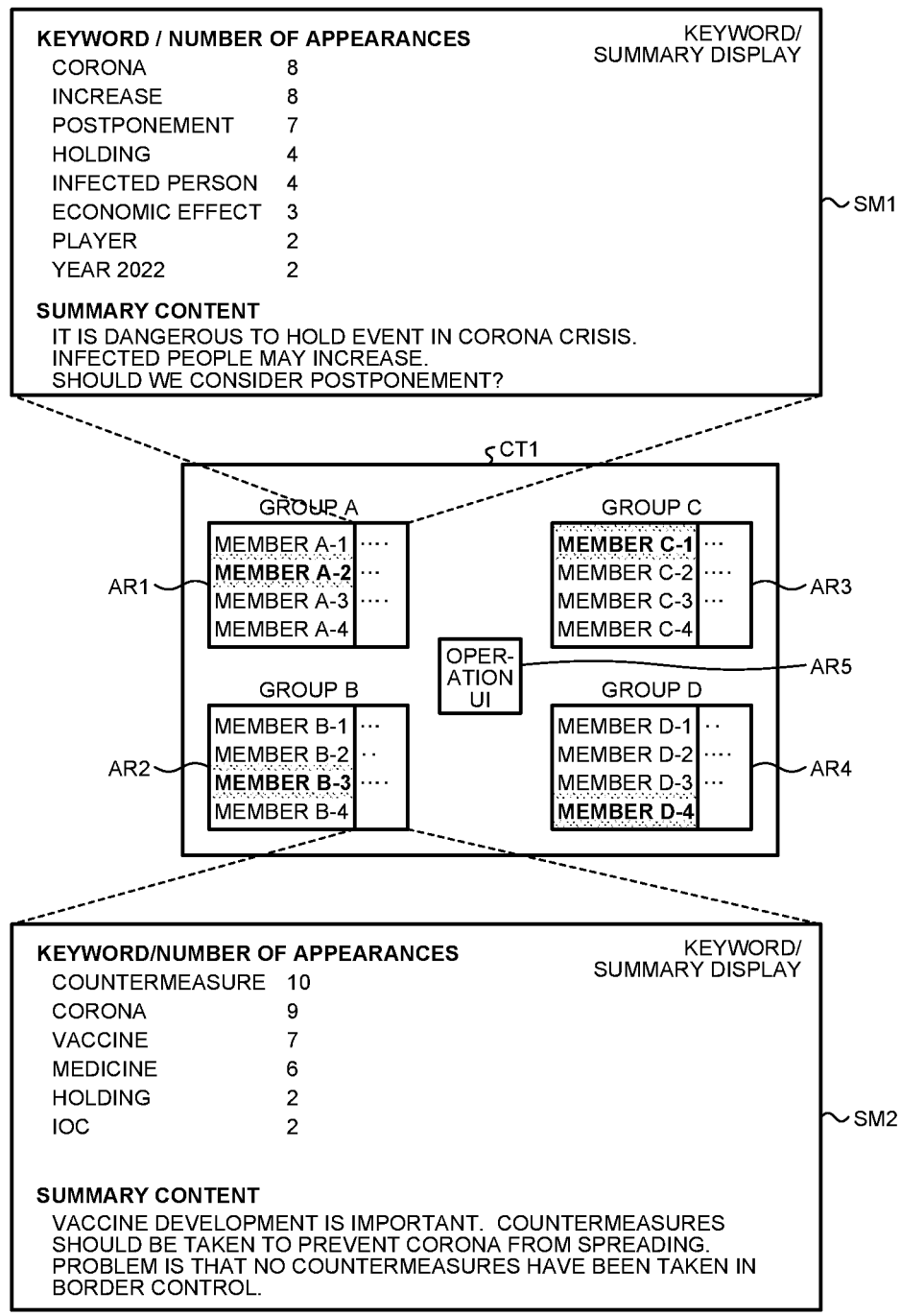
FIG. 3 is a diagram illustrating an example of display to an administrator.

FIG. 3 illustrates display contents of the group content information SM1 of the group A and the group content information SM2 of the group B among the group content information SM1 to SM4 displayed in the second areas of the areas AR1 to AR4 in FIG. 1 as an example.

The group content information SM1 indicates a case where information such as the number of appearances of each keyword in the conversation in the group A and the summary content of the conversation in the group A is displayed in a display mode of keyword/summary display. In FIG. 3, the group content information SM1 indicates that the number of appearances of the keywords "corona" and "increase" is eight in the conversation in the group A, which is the maximum number of appearances. Furthermore, the group content information SM1 indicates that the number of appearances of the keyword "postponement" is seven and the number of appearances of the keywords "holding" and "infected person" is four in the conversation in the group A. Furthermore, the group content information SM1 indicates that the number of appearances of the keyword "economic effect" is three, and the number of appearances of the keywords "player" and "year 2022" is two in the conversation in the group A.

Furthermore, the group content information SM1 indicates that the summary of the conversation in the group A is "It is dangerous to hold the event in the corona crisis. Infected people may increase. Should we consider postponement?". For example, the remote meeting server 100 generates the above-described keyword and information indicating the number of appearances thereof by analyzing the log information of the conversation in the group A. Furthermore, the remote meeting server 100 generates the above-described summary by analyzing the log information of the conversation in the group A. Note that the keyword extraction and the summary generation may be appropriately performed using various conventional techniques such as sentence analysis and natural language processing, and a detailed description thereof will be omitted.

The group content information SM2 indicates a case where information such as the number of appearances of each keyword in the conversation in the group B and the summary content of the conversation in the group B is displayed in a display mode of keyword/summary display. In FIG. 3, the group content information SM2 indicates that the number of appearances of the keyword "countermeasure" is 10 times, which is the maximum number of appearances in the conversation in the group B. Furthermore, the group content information SM2 indicates that the number of appearances of the keyword "corona" is nine and the number of appearances of the keyword "vaccine" is seven in the conversation in the group B. Furthermore, the group content information SM2 indicates that the number of appearances of the keyword "medicine" is six and the number of appearances of the keywords "holding" and "IOC" is two in the conversation in the group B.

Furthermore, the group content information SM2 indicates that the summary of the conversation in the group B is "Vaccine development is important. Countermeasures should be taken to prevent corona from spreading. The problem is that no countermeasures have been taken in border control.". For example, the remote meeting server 100 generates the above-described keyword and information indicating the number of appearances thereof by analyzing the log information of the conversation in the group B. Furthermore, the remote meeting server 100 generates the above-described summary by analyzing the log information of the conversation in the group B.

In FIG. 3, the discussion contents of the group A and the group B are illustrated as an example. In the group A, it seems that there is a discussion on whether to hold or postpone the Olympics. The group B seems to be talking about vaccine development and issues with infection spread. In this manner, by the display mode of the keyword/summary display as illustrated in the group content information SM1 and SM2 of FIG. 3, the remote lecture system 1 can cause the administrator to confirm what is being spoken in each group.

For example, in a case of sending a comment from the lecturer FC to each group member, various modes can be adopted. For example, if the lecturer has prepared this group work as a place where he/she wants to gather about "How do you think about holding the Olympics?", the lecturer may send a comment to the group B so that the lecturer can discuss whether or not to hold the Olympics. In the way of sending the comment in this case, in the remote lecture system 1, the area AR2 of the group B is selected (clicked or the like) on the plural group list information CT which is the entire grasping screen, an intention to send the comment is displayed toward the group B, and then the comment is sent only to the group B by talking to the group B. Note that the provision of the comment described above is merely an example, and the remote lecture system 1 may provide the comment to the member terminal 20 in various modes, but this point will be described later.

1-1-3. Background and Effects

In the group work in the conventional remote environment, the environment is closed only among the members divided for each group. For this reason, the lecturer and the facilitator have to enter the environment of each group in order to know the progress and discussion contents of each group. In order to grasp the situation of another group environment, it is necessary to leave the group environment once and move to another group environment, which causes trouble.

Therefore, the remote lecture system 1 solves a situation in which it is difficult for a lecturer or a facilitator to grasp a discussion content and a progress degree of each group in a group work performed in a remote environment. In the example described above, in the remote lecture system 1, it is possible to give an overview of who is speaking, what is speaking, and whether the discussion is actively performed in each group.

As a result, the remote lecture system 1 can provide an environment for a lecturer or a facilitator to smoothly and efficiently progress a group work in a group work performed in a lecture or a brainstorming in a remote environment. Furthermore, the remote lecture system 1 can provide an environment in which participants and brainstorming participants can have a thorough discussion. Furthermore, the remote lecture system 1 solves a situation in which it is difficult for a lecturer or a facilitator to provide information such as a comment to each group, but this point will be described later.

1-2. Configuration of a Remote Lecture System According to an Embodiment

Figure 4:
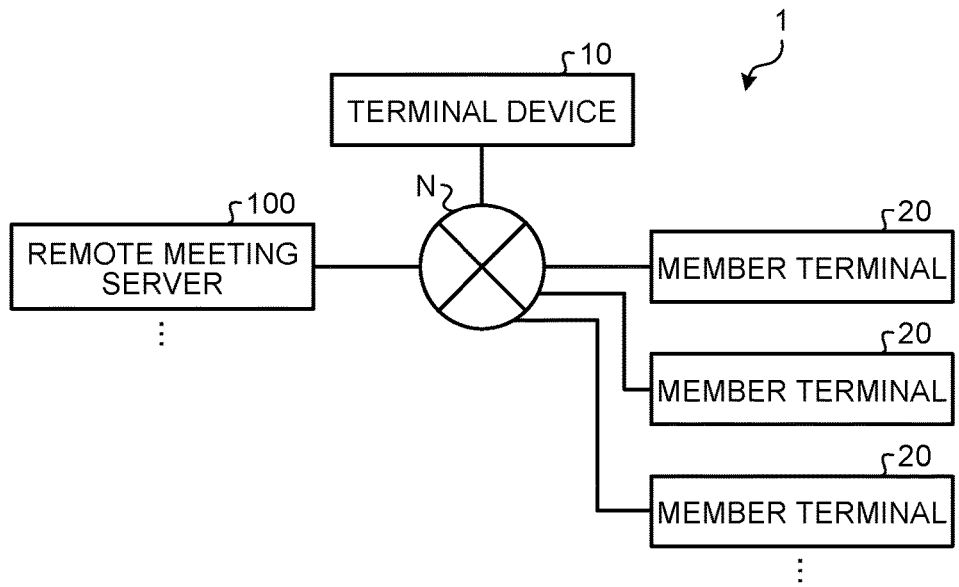
FIG. 4 is a diagram illustrating a configuration example of a remote lecture system according to an embodiment of the present disclosure.

The remote lecture system 1 illustrated in FIG. 4 will be described. As illustrated in FIG. 4, the remote lecture system 1 includes a remote meeting server 100, a terminal device 10, and a plurality of member terminals 20. The remote meeting server 100, the terminal device 10, and each of the plurality of member terminals 20 are communicably connected by wire or wirelessly via a predetermined communication network (network N). FIG. 4 is a diagram illustrating a configuration example of a remote lecture system according to an embodiment. Note that, although only three member terminals 20 are illustrated in FIG. 4, the remote lecture system 1 includes the member terminals 20 whose number is larger than or equal to the number of users participating in the remote meeting. Furthermore, the remote lecture system 1 illustrated in FIG. 4 may include a plurality of the remote meeting servers 100 and a plurality of the terminal devices 10.

The remote meeting server 100 is a computer used to provide a remote meeting service to the user. The remote meeting server 100 is an information processing apparatus that provides a meeting service for performing group work or the like. The remote meeting server 100 transmits, to the terminal device 10, a plurality of groups list information for displaying group content information regarding a content of a conversation in at least one or more groups among the plurality of groups in association with a corresponding group together with the plurality of groups. The remote meeting server 100 transmits the comment to the member received from the terminal device 10 to the corresponding member terminal 20.

Furthermore, the remote meeting server 100 has a function of voice recognition. For example, the remote meeting server 100 has functions of natural language understanding (NLU) and automatic speech recognition (ASR). The remote meeting server 100 may include software modules for voice signal processing, voice recognition, utterance semantic analysis, interaction control, and the like. For example, the remote meeting server 100 may convert the user's utterance into text, and estimate the user's utterance content using the converted utterance (that is, character information of the utterance). Note that the remote meeting server 100 may communicate with a speech recognition server having a function of natural language understanding and automatic speech recognition, and acquire utterance converted into text by the speech recognition server or information indicating estimated utterance content from the speech recognition server.

The terminal device 10 is a computer that displays, together with a plurality of groups, plural-group list information that displays group content information regarding a content of a conversation in at least one or more groups among the plurality of groups in association with a corresponding group. The terminal device 10 is a device used by a user (administrator) such as a lecturer or a facilitator who manages (facilitates) a remote meeting (meeting). For example, the terminal device 10 invites other users (members) to a meeting or divides other users (members) into groups at the time of group work according to an operation of a user who is an administrator (host).

The terminal device 10 outputs information regarding the remote meeting. The terminal device 10 displays the image (video) of the remote meeting and outputs the voice of the remote meeting by voice. For example, the terminal device 10 transmits the utterance and image (video) of the user to the remote meeting server 100, and receives the voice and image (video) of the remote meeting from the remote meeting server 100. The terminal device 10 transmits a comment to the member.

The terminal device 10 receives an input by the user. The terminal device 10 receives a voice input by a user's utterance or an input by a user's operation. The terminal device 10 may be any device as long as the processing in the embodiment can be realized. The terminal device 10 may be any device as long as it has a function of performing information display, voice output, and the like of a remote meeting. For example, the terminal device 10 may be a device such as a notebook personal computer (PC), a tablet terminal, a desktop PC, a smartphone, a smart speaker, a television, a mobile phone, or a personal digital assistant (PDA).

Furthermore, the terminal device 10 may have a function of voice recognition such as natural language understanding and automatic voice recognition. For example, the terminal device 10 may convert the user's utterance into text, and estimate the user's utterance content using the converted utterance (that is, character information of the utterance).

The member terminal 20 is a device used by a user (member) participating in the remote meeting. The member terminal 20 outputs information regarding the remote meeting. The member terminal 20 displays the image (video) of the remote meeting and outputs the voice of the remote meeting by voice. For example, the member terminal 20 transmits the utterance and image (video) of the user to the remote meeting server 100, and receives the voice and image (video) of the remote meeting from the remote meeting server 100. The member terminal 20 displays the intra-group screen. The member terminal 20 receives a comment from an administrator such as a lecturer or a facilitator. The member terminal 20 displays the received comment from the administrator.

The member terminal 20 receives an input from the user. The member terminal 20 receives a voice input by user's utterance and an input by user's operation. The member terminal 20 may be any device as long as the processing in the embodiment can be realized. The member terminal 20 may be any device as long as it has a function of performing information display, voice output, and the like of a remote meeting. For example, the member terminal 20 may be a device such as a notebook PC, a tablet terminal, a desktop PC, a smartphone, a smart speaker, a television, a mobile phone, or a PDA.

Furthermore, the member terminal 20 may have a function of voice recognition such as natural language understanding and automatic voice recognition. For example, the member terminal 20 may convert the user's utterance into text, and estimate the user's utterance content using the converted utterance (that is, character information of the utterance). The member terminal 20 may be any device as long as it can participate in a meeting and perform processing as a member other than an administrator (host) such as a lecturer. The member terminal 20 is similar to the terminal device 10 in performing input and output related to a remote meeting except for input and output specific to an administrator such as a lecturer. Note that the functional configuration of the member terminal 20 is also similar to that of the terminal device 10 illustrated in FIG. 8, and thus a detailed description of the functional configuration will be omitted.

Figure 5:
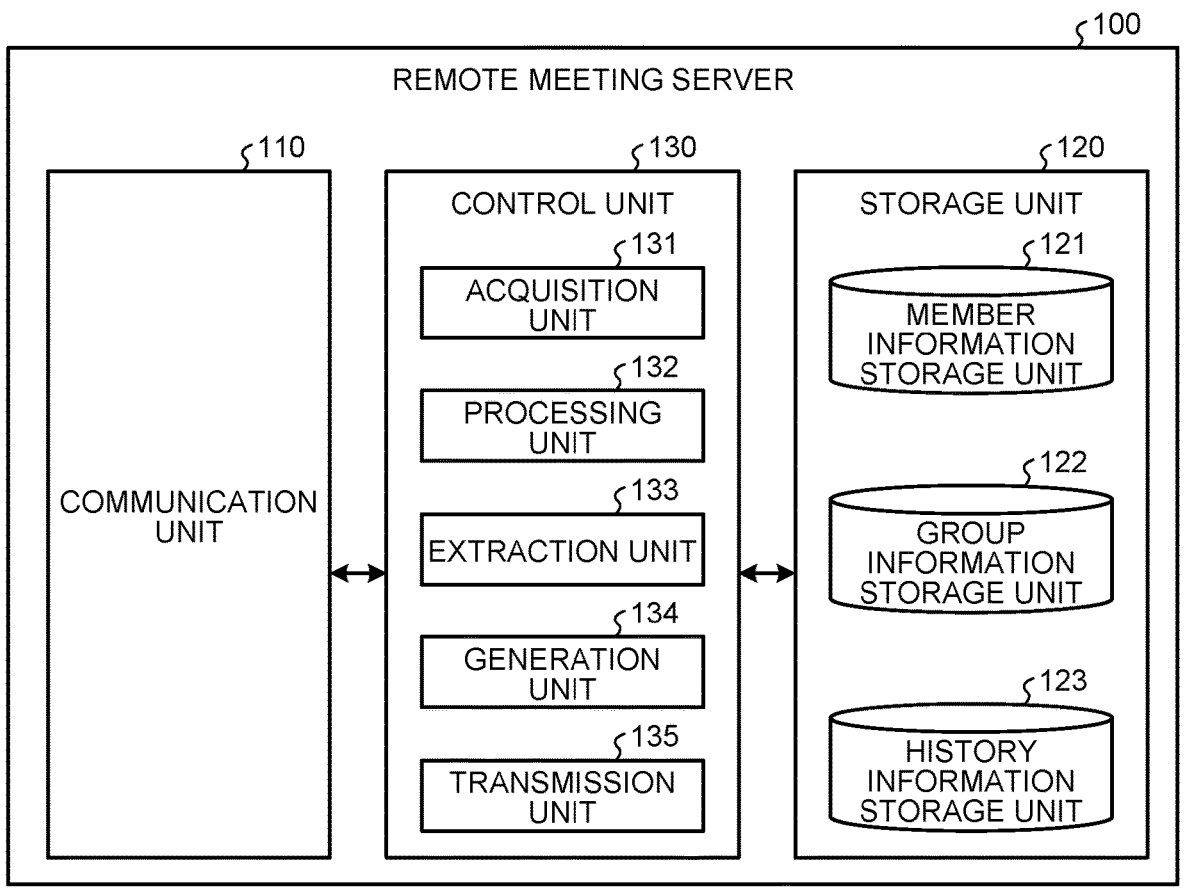
FIG. 5 is a diagram illustrating a configuration example of a remote meeting server according to an embodiment of the present disclosure.

1-3. Configuration of an Information Processing Apparatus According to an Embodiment Next, a configuration of the remote meeting server 100, which is an example of an information processing apparatus that executes information processing according to the embodiment, will be described. FIG. 5 is a diagram illustrating a configuration example of a remote meeting server according to an embodiment of the present disclosure.

As illustrated in FIG. 5, the remote meeting server 100 includes a communication unit 110, a storage unit 120, and a control unit 130. Note that the remote meeting server 100 may include an input unit (for example, a keyboard, a mouse, or the like) that receives various operations from an administrator or the like of the remote meeting server 100, and a display unit (for example, a liquid crystal display or the like) for displaying various information.

The communication unit 110 is realized by, for example, a network interface card (NIC) or the like. Then, the communication unit 110 is connected to the network N (see FIG. 4) in a wired or wireless manner, and transmits and receives information to and from other information processing apparatuses such as the terminal device 10 and the member terminal 20. Furthermore, the communication unit 110 may transmit and receive information to and from a user terminal (not illustrated) used by the user.

The storage unit 120 is realized by, for example, a semiconductor memory element such as a random access memory (RAM) or a flash memory, or a storage device such as a hard disk or an optical disk. As illustrated in FIG. 5, the storage unit 120 according to the embodiment includes a user information storage unit 121, a group information storage unit 122, and a history information storage unit 123.

The user information storage unit 121 according to the embodiment stores various types of information regarding the user. For example, the user information storage unit 121 stores information on the user participating in the remote meeting. The user information storage unit 121 stores attribute information and the like of each user. The user information storage unit 121 stores user information corresponding to information for identifying each user (user ID or the like) in association with each other.

The group information storage unit 122 according to the embodiment stores various types of information regarding the group. The group information storage unit 122 stores various types of information regarding a plurality of groups corresponding to each of the plurality of groups in the remote meeting. FIG. 6 is a diagram illustrating an example of a group information storage unit according to the embodiment of the present disclosure. In the example illustrated in FIG. 6, the group information storage unit 122 includes items such as "group ID", "group content information", and "member".

The "group ID" indicates identification information for identifying a group. The "group content information" indicates group content information in the corresponding group. For example, the "group content information" indicates group content information based on the dialogue in the group. FIG. 6 illustrates an example in which conceptual information such as "SM1" is stored in the "group content information", but in practice, specific information such as the number of appearances of each keyword and summary content is stored.

The "member" indicates a member of the group. For example, in the "member", information (user ID or the like) for identifying a member (user) belonging to a group is stored.

In the example illustrated in FIG. 6, the group content information of the group (group A) identified by the group ID "GP1" is the group content information SM1. Furthermore, it is indicated that a user (member A-1) identified by the user ID "A-1", a user (member A-2) identified by the user ID "A-2", a user (member A-3) identified by the user ID "A-3", a user (member A-4) identified by the user ID "A-4", and the like belong to the group A as members.

Note that the group information storage unit 122 is not limited to the above, and may store various types of information depending on the purpose.

The history information storage unit 123 according to the embodiment stores various types of information regarding the history of the past group works. The history information storage unit 123 stores contents discussed in past lectures, brainstorming, and the like. FIG. 7 is a diagram illustrating an example of a history information storage unit according to the embodiment of the present disclosure. In the example illustrated in FIG. 7, the history information storage unit 123 includes items such as "keyword", "summary content", and "case example of comments". Note that the history information storage unit 123 is not limited to the above, and may store various types of information depending on the purpose. For example, the history information storage unit 123 may store a log ID for identifying each log.

The "keyword" indicates a keyword corresponding to the summary content and the case example of comments. For example, the "keyword" is a keyword designated by an administrator such as a lecturer or a keyword extracted from a dialogue. The "summary content" indicates a summary of content related to a keyword in a group dialogue. The "case example of comments" indicates a case example of comments made by an administrator such as a lecturer for the corresponding keyword and summary content.

The example illustrated in FIG. 7 indicates that the summary content of the keywords "holding" and "postponement" is "It is dangerous to hold the event during the corona crisis. Should we consider postponement?". That is, it is indicated that the summary of the content of the dialogue in the group with respect to the keywords and "postponement" is "It is dangerous to hold the event during the corona crisis. Should we consider postponement?".

Furthermore, it is indicated that a case example of comments regarding the keywords "holding" and "postponement" is "List merits and demerits when holding". That is, it indicates that the comment made by the administrator such as the lecturer about the keywords "holding" and "postponement", and summary content "It is dangerous to hold the event during the corona crisis. Should we consider postponement?" is "List merits and demerits when holding".

Furthermore, the summary content for the keyword "medical care" is "Medical sites are under strain.". That is, it indicates that the summary of the content of the dialogue in the group for the keyword "medical care" is "Medical sites are under strain.".

Furthermore, it is indicated that a case example of comments regarding the keyword "medical care" is "What is needed to support?". That is, regarding the keyword "medical care" and the summary content "Medical sites are under strain.", the comment made by the administrator such as the lecturer indicates "What is needed to support?".

Note that the history information storage unit 123 is not limited to the above, and may store various types of information depending on the purpose.

Furthermore, the storage unit 120 may store various types of information other than the above. For example, the storage unit 120 stores various types of information regarding the remote meeting. The storage unit 120 stores various data for providing output data to the terminal device 10 and the member terminal 20. For example, the storage unit 120 stores various types of information used for generating information to be displayed on the terminal device 10 and the member terminal 20. For example, the storage unit 120 stores information regarding content displayed by an application (a remote meeting application or the like) installed in the terminal device 10 and the member terminal 20. For example, the storage unit 120 stores information regarding the content displayed by the remote meeting application. Note that the above is merely an example, and the storage unit 120 may store various types of information used for providing the remote meeting service to the user.

The storage unit 120 stores information of a voice recognition application (program) that realizes a voice recognition function. For example, the terminal device 10 can execute voice recognition by activating a voice recognition application (also simply referred to as "voice recognition"). The storage unit 120 stores various types of information used for voice recognition. The storage unit 120 stores information of a dictionary (voice recognition dictionary) used for the voice recognition dictionary. The storage unit 120 stores information on a plurality of voice recognition dictionaries.

Returning to FIG. 5, the description will be continued. The control unit 130 is implemented by, for example, a central processing unit (CPU), a micro processing unit (MPU), or the like executing a program (for example, an information processing program or the like according to the present disclosure) stored inside the remote meeting server 100 using a random access memory (RAM) or the like as a work area. Furthermore, the control unit 130 is realized by, for example, an integrated circuit such as an application specific integrated circuit (ASIC) or a field programmable gate array (FPGA).

As illustrated in FIG. 5, the control unit 130 includes an acquisition unit 131, a processing unit 132, an extraction unit 133, a generation unit 134, and a transmission unit 135, and realizes or executes a function and an action of information processing described below. Note that the internal configuration of the control unit 130 is not limited to the configuration illustrated in FIG. 5, and may be another configuration as long as information processing to be described later is performed. Furthermore, a connection relationship among the processing units included in the control unit 130 is not limited to the connection relationship illustrated in FIG. 5, and may be another connection relationship.

The acquisition unit 131 acquires various information. The acquisition unit 131 acquires various information from an external information processing apparatus. The acquisition unit 131 acquires various types of information from the terminal device 10 and the member terminal 20. The acquisition unit 131 acquires information detected by the terminal device 10 from the terminal device 10. The acquisition unit 131 acquires information detected by the member terminal 20 from the member terminal 20. The acquisition unit 131 acquires various information from the storage unit 120.

The acquisition unit 131 acquires information regarding the remote meeting. The acquisition unit 131 acquires information such as an utterance or an image of the user. The acquisition unit 131 receives information such as an utterance and an image of the user who uses the terminal device 10 from the terminal device 10. The acquisition unit 131 receives information such as an utterance or an image of the user who uses the member terminal 20 from the member terminal 20.

The acquisition unit 131 acquires group content information regarding the content of a conversation in at least one or more groups among a plurality of groups in which a plurality of users participating in a remote meeting are divided and can have a conversation in each group. The acquisition unit 131 acquires the group content information from the group information storage unit 122.

The processing unit 132 executes various processes. The processing unit 132 executes image processing. The processing unit 132 executes processing related to voice recognition. The processing unit 132 executes voice recognition processing using the information stored in the storage unit 120. The processing unit 132 converts the utterance of the user into a text by converting the utterance of the user into character information. The processing unit 132 can be realized by using an existing utterance semantic analysis technology.

Furthermore, the processing unit 132 analyzes the content of the utterance of the user. The processing unit 132 estimates the content of the user's utterance by analyzing the user's utterance using various conventional technologies as appropriate. For example, the processing unit 132 analyzes the content of the user's utterance by the functions of natural language understanding (NLU) and automatic speech recognition (ASR). The processing unit 132 estimates (specifies) the content of the utterance of the user by semantic analysis using character information corresponding to the utterance of the user. For example, the processing unit 132 estimates the content of the utterance of the user corresponding to the character information by analyzing the character information appropriately using various conventional techniques such as syntax analysis.

The processing unit 132 executes processing related to data holding. The processing unit 132 accumulates information such as the image/audio and the voice recognition result transmitted from each of the terminal device 10 and the member terminal 20. The processing unit 132 stores, in the storage unit 120, information such as image/audio and the voice recognition result transmitted from each of the terminal device 10 and the member terminal 20.

The processing unit 132 executes keyword extraction processing. The processing unit 132 extracts a keyword on the basis of the conversation of the group. The processing unit 132 extracts the designated keyword or the utterance corresponding to the extracted keyword from the utterances of the members in the group. The processing unit 132 searches the utterance history of the member in the group using the designated keyword or the extracted keyword as the extraction keyword, and extracts an utterance including a character string matching the extraction keyword. Furthermore, the processing unit 132 executes summary generation processing. The processing unit 132 selects an utterance corresponding to the keyword from among the utterances of the members in the group, and generates a summary on the basis of the selected utterance. For example, the processing unit 132 selects an utterance corresponding to the keyword from among the utterances of the members in the group, and uses a sentence of the selected utterance as a sentence of the summary. For example, the processing unit 132 may select an utterance including a predetermined number or more of keywords from among the utterances of the members in the group, and use a sentence of the selected utterance as a sentence of the summary. Furthermore, the processing unit 132 may select an utterance including a predetermined number or more of keywords from among the utterances of the members in the group, and generate a summary using a sentence of the selected utterance. In this case, the processing unit 132 generates a summary by using the sentence of the selected utterance by a technology related to summary generation.

The extraction unit 133 searches for various types of information and extracts information. The extraction unit 133 extracts a target comment from a history of comments made in the past. The extraction unit 133 extracts the target comment corresponding to the target group on the basis of the information regarding the target group to be assisted.

The extraction unit 133 extracts the target comment by searching the history with the designated keyword. The extraction unit 133 extracts the target comment on the basis of the similarity between each comment in the history and the keyword. The extraction unit 133 extracts the target comment on the basis of a comparison between the similarity between each comment in the history and the keyword and a designated threshold value.

The generation unit 134 generates various types of information. The generation unit 134 generates various types of information on the basis of information from an external information processing apparatus or information stored in the storage unit 120. The generation unit 134 generates various types of information on the basis of information from other information processing apparatuses such as the terminal device 10 and the member terminal 20. The generation unit 134 generates various types of information on the basis of information stored in the user information storage unit 121, the group information storage unit 122, or the history information storage unit 123. The generation unit 134 generates various types of information to be displayed on the terminal device 10 or the member terminal 20 on the basis of the information determined by the processing unit 132.

The generation unit 134 executes various processing related to an image to be provided to the terminal device 10 or the member terminal 20. The generation unit 134 arranges the voice and the image of the group in which the user of each member terminal 20 participates as a member into information in a necessary output form. The generation unit 134 generates output data to be provided to the member terminal 20 by using the adjusted parameter. The generation unit 134 generates output data used for information output of the remote meeting in the member terminal 20. For example, the generation unit 134 generates output data including parameters indicating the volume of each group, the arrangement position and size of an image of each group, and the like.

Furthermore, the generation unit 134 may generate a display screen (content) to be displayed on the terminal device 10 or the member terminal 20 as output data. For example, the generation unit 134 may generate a screen (content) to be provided to the terminal device 10 or the member terminal 20 by appropriately using various technologies such as Java (registered trademark). Note that the generation unit 134 may generate a screen (content) to be provided to the terminal device 10 or the member terminal 20 on the basis of a format such as CSS, JavaScript (registered trademark), or HTML. Furthermore, for example, the generation unit 134 may generate a screen (content) in various formats such as joint photographic experts group (JPEG), graphics interchange format (GIF), and portable network graphics (PNG).

The transmission unit 135 functions as an output unit that executes output processing. The transmission unit 135 transmits information to the terminal device 10. The transmission unit 135 transmits the information generated by the generation unit 134 to the terminal device 10. The transmission unit 135 transmits the output data generated by the generation unit 134 to the terminal device 10.

The transmission unit 135 transmits information to the member terminal 20. The transmission unit 135 transmits the information generated by the generation unit 134 to the member terminal 20. The transmission unit 135 transmits the output data generated by the generation unit 134 to the member terminal 20.

The transmission unit 135 outputs the plural group list information displaying the group content information in association with the corresponding group together with the plurality of groups. The transmission unit 135 transmits the plural group list information to the terminal device 10 used by the administrator (lecturer or the like) who manages the meeting (meeting). The transmission unit 135 transmits assist information for making a comment to at least one or more groups among the plurality of groups to the terminal device 10. The transmission unit 135 transmits information regarding comments made in the past to the terminal device 10 as the assist information.

1-4. Configuration of a Terminal Device According to an Embodiment

Figure 8:
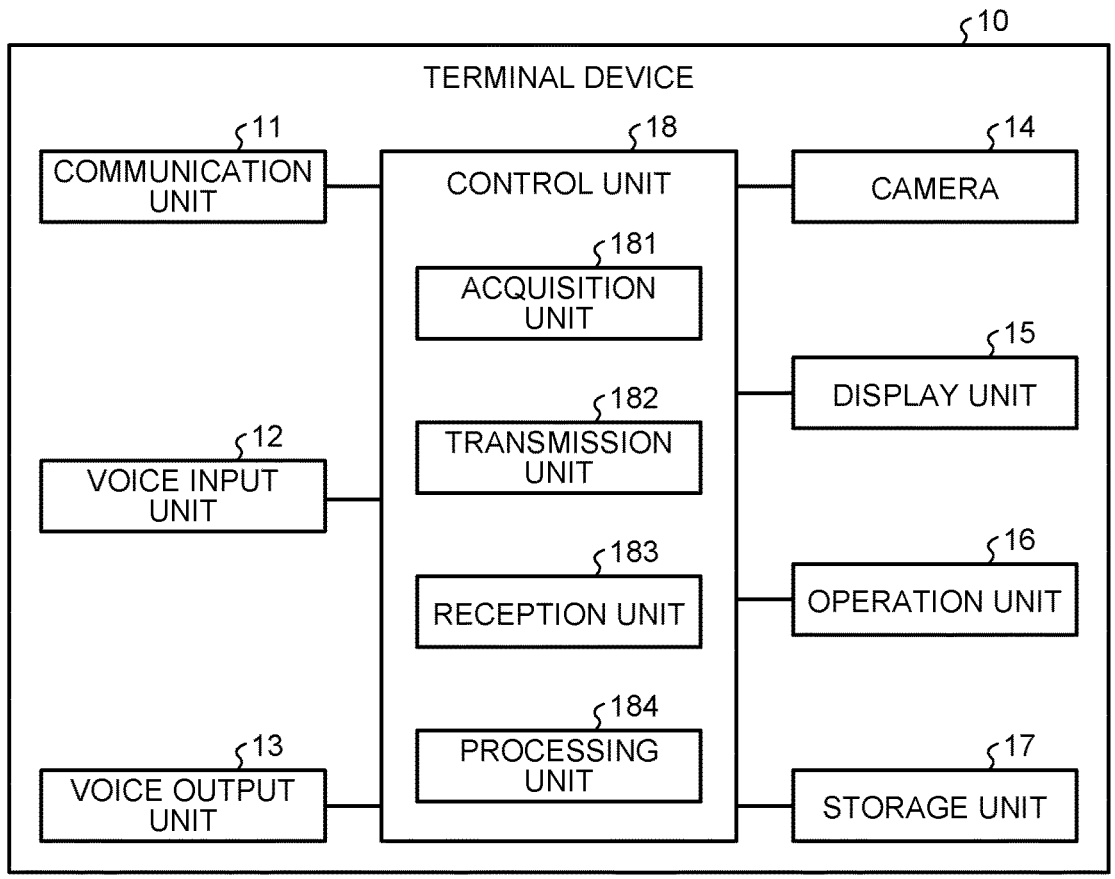
FIG. 8 is a diagram illustrating a configuration example of a terminal device according to an embodiment of the present disclosure.

Next, a configuration of the terminal device 10 which is an example of an information processing apparatus that executes information processing according to the embodiment will be described. FIG. 8 is a diagram illustrating a configuration example of the terminal device according to an embodiment of the present disclosure.

As illustrated in FIG. 8, the terminal device 10 includes a communication unit 11, a voice input unit 12, a voice output unit 13, a camera 14, a display unit 15, an operation unit 16, a storage unit 17, and a control unit 18.

The communication unit 11 is realized by, for example, an NIC, a communication circuit, or the like. Then, the communication unit 11 is connected to a predetermined communication network (network) in a wired or wireless manner, and transmits and receives information to and from an external information processing apparatus. For example, the communication unit 11 is connected to a predetermined communication network in a wired or wireless manner, and transmits and receives information to and from the remote meeting server 100.

The voice input unit 12 functions as an input unit that receives an operation by a user's voice (utterance). The voice input unit 12 is, for example, a microphone or the like, and detects the voice. For example, the voice input unit 12 detects user's utterance. The voice input unit 12 receives a voice input indicating an operation related to the group displayed in the plural group list information. Note that the voice input unit 12 may have any configuration as long as it can detect user's utterance information necessary for processing.

The voice output unit 13 is realized by a speaker that outputs a voice, and is an output device for outputting various types of information as a voice. The voice output unit 13 voice-outputs the content provided from the remote meeting server 100. For example, the voice output unit 13 outputs a voice corresponding to the information displayed on the display unit 15. The terminal device 10 inputs and outputs a voice using the voice input unit 12 and the voice output unit 13.

The camera 14 includes an image sensor that detects an image. The camera 14 captures an image of the user participating in the remote meeting. For example, in a case where the terminal device 10 is a notebook computer, the camera 14 may be built in the terminal device 10 and disposed on an upper part of the display unit 15. Furthermore, for example, in the case of a smartphone, the camera 14 may be an in-camera built in the terminal device 10.

The display unit 15 is a display screen of a tablet terminal or the like realized by, for example, a liquid crystal display, an organic electro-luminescence (EL) display, or the like, and is a display device for displaying various types of information.

The display unit 15 displays various types of information regarding the remote meeting. The display unit 15 displays content. The display unit 15 displays various types of information received from the remote meeting server 100. The display unit 15 outputs the information on the remote meeting received from the remote meeting server 100.

The display unit 15 displays, together with a plurality of groups in which a plurality of users participating in a remote meeting are divided and can have a conversation in each group, plural group list information that displays group content information regarding a content of a conversation in at least one or more groups among the plurality of groups in association with a corresponding group.

The display unit 15 changes the display mode according to the user's operation received by the voice input unit 12 or the operation unit 16. In a case where an operation of displaying the assist information to the user is received by the voice input unit 12 or the operation unit 16, the display unit 15 displays the assist information. The display unit 15 displays information regarding the past comment as the assist information.

In a case where the operation of changing the display mode of the group content information is received by the voice input unit 12 or the operation unit 16, the display unit 15 changes the display mode of the group content information. The display unit 15 displays the plural group list information in which the group content information is displayed in association with the corresponding group together with the plurality of groups. The display unit 15 displays assist information for making a comment to at least one or more groups among the plurality of groups. The display unit 15 displays information regarding comments made in the past as the assist information.

The operation unit 16 functions as an input unit that receives various user operations. The operation unit 16 receives an operation related to the group displayed in the plural group list information from the user who uses the terminal device 10. In the example of FIG. 8, the operation unit 16 is a keyboard, a mouse, or the like. Furthermore, the operation unit 16 may have a touch panel capable of realizing functions equivalent to those of a keyboard and a mouse. In this case, the operation unit 16 receives various operations from the user via the display screen by a function of a touch panel realized by various sensors. For example, the operation unit 16 receives various operations from the user via the display unit 15.

For example, the operation unit 16 receives an operation such as a designation operation by the user via the display unit 15 of the terminal device 10. Note that, as a method of detecting the user's operation by the operation unit 16, a capacitance method is mainly adopted in the tablet terminal, but any method may be adopted as long as the user's operation can be detected and the function of the touch panel can be realized, such as a resistive film method, a surface acoustic wave method, an infrared method, and an electromagnetic induction method, which are other detection methods.

The above keyboard, mouse, touch panel, and the like are merely examples, and the terminal device 10 is not limited to the above, and may have a configuration of receiving (detecting) various information as an input. For example, the terminal device 10 may have a line-of-sight sensor that detects the line of sight of the user. The line-of-sight sensor detects the line-of-sight direction of the user using an eye tracking technology on the basis of detection results of the camera 14, the optical sensor, the motion sensor (all not illustrated), and the like mounted on the terminal device 10, for example. The line-of-sight sensor determines a gaze region at which the user is gazing on the screen on the basis of the detected line-of-sight direction. The line-of-sight sensor may transmit line-of-sight information including the determined gaze region to the remote meeting server 100. For example, the terminal device 10 may include a motion sensor that detects a gesture or the like of the user. The terminal device 10 may receive an operation by a gesture of the user by the motion sensor.

The storage unit 17 is realized by, for example, a semiconductor memory element such as a random access memory (RAM) or a flash memory, or a storage device such as a hard disk or an optical disk. The storage unit 17 stores, for example, various types of information received from the remote meeting server 100. The storage unit 17 stores, for example, information regarding an application (for example, a remote meeting application or the like) installed in the terminal device 10, for example, a program or the like.

The storage unit 17 stores user information. The storage unit 17 stores an utterance history (a history of a speech recognition result) and an action history of the user.

The control unit 18 is a controller, and is implemented by, for example, a CPU, an MPU, or the like executing various programs stored in a storage device such as the storage unit 17 inside the terminal device 10 using a RAM as a work area. For example, the various programs include a program of an application (for example, a remote meeting application) that performs information processing. Furthermore, the control unit 18 is a controller, and is realized by, for example, an integrated circuit such as an ASIC or an FPGA.

As illustrated in FIG. 8, the control unit 18 includes an acquisition unit 181, a transmission unit 182, a reception unit 183, and a processing unit 184, and implements or executes a function and an action of information processing described below. Note that the internal configuration of the control unit 18 is not limited to the configuration illustrated in FIG. 8, and may be another configuration as long as information processing to be described later is performed. Furthermore, the connection relationship among the processing units included in the control unit 18 is not limited to the connection relationship illustrated in FIG. 8, and may be another connection relationship.

The acquisition unit 181 acquires various types of information. For example, the acquisition unit 181 acquires various types of information from an external information processing apparatus. For example, the acquisition unit 181 stores the acquired various types of information in the storage unit 17. The acquisition unit 181 acquires user's operation information received by the operation unit 16.

The acquisition unit 181 acquires utterance information of the user. The acquisition unit 181 acquires the utterance information of the user detected by the voice input unit 12.

The transmission unit 182 transmits information to the remote meeting server 100 via the communication unit 11. The transmission unit 182 transmits information regarding the remote meeting to the remote meeting server 100. The reception unit 183 transmits information input by user's utterance, operation, or the like. The reception unit 183 transmits a comment by an administrator such as a lecturer or a facilitator.

The reception unit 183 receives information from the remote meeting server 100 via the communication unit 11. The reception unit 183 receives information provided by the remote meeting server 100. The reception unit 183 receives content from the remote meeting server 100.

The processing unit 184 executes various processes. The processing unit 184 executes processing according to the user's operation received by the voice input unit 12 or the operation unit 16. In a case where an operation of giving a comment to at least one or more groups among the plurality of groups is received by the voice input unit 12 or the operation unit 16, the processing unit 184 executes processing of transmitting a comment to a group corresponding to the operation. In a case where an operation of giving a comment to all of the plurality of groups is received by the voice input unit 12 or the operation unit 16, the processing unit 184 executes processing of transmitting the comment to all of the plurality of groups.

The processing unit 184 displays various types of information via the display unit 15. For example, the processing unit 184 functions as a display control unit that controls display on the display unit 15. The processing unit 184 outputs various types of information by voice via the voice output unit 13. For example, the processing unit 184 functions as a sound output control unit that controls sound output of the voice output unit 13.

The processing unit 184 causes the display unit 15 to display, together with a plurality of groups in which a plurality of users participating in a remote meeting are divided and can have a conversation in each group, plural group list information that displays group content information regarding a content of a conversation in at least one or more groups among the plurality of groups in association with a corresponding group.

The processing unit 184 changes the display mode according to the user's operation received by the voice input unit 12 or the operation unit 16. In a case where an operation of displaying the assist information to the user is received by the voice input unit 12 or the operation unit 16, the processing unit 184 displays the assist information on the display unit 15. The processing unit 184 causes the display unit 15 to display information regarding the past comment as the assist information.

In a case where an operation of changing the display mode of the group content information is received by the voice input unit 12 or the operation unit 16, the processing unit 184 causes the display unit 15 to change the display mode of the group content information. The processing unit 184 causes the display unit 15 to display the plural group list information in which the group content information is displayed in association with the corresponding group together with the plurality of groups. The processing unit 184 causes the display unit 15 to display assist information for making a comment to at least one or more groups among the plurality of groups. The processing unit 184 causes the display unit 15 to display information regarding comments made in the past as the assist information.

The processing unit 184 outputs the information received by the acquisition unit 181. The processing unit 184 outputs the content provided from the remote meeting server 100. The processing unit 184 outputs the content received by the acquisition unit 181 via the voice output unit 13 or the display unit 15. The processing unit 184 displays content via the display unit 15. The processing unit 184 outputs the content by voice via the voice output unit 13.

The processing unit 184 transmits various types of information to an external information processing apparatus via the communication unit 11. The processing unit 184 transmits various types of information to the remote meeting server 100. The processing unit 184 transmits various types of information stored in the storage unit 17 to an external information processing apparatus. The processing unit 184 transmits various types of information acquired by the acquisition unit 181 to the remote meeting server 100. The processing unit 184 transmits the sensor information acquired by the acquisition unit 181 to the remote meeting server 100. The processing unit 184 transmits the operation information of the user received by the operation unit 16 to the remote meeting server 100. The processing unit 184 transmits information such as an utterance and an image of the user who uses the terminal device 10 to the remote meeting server 100.

Note that each processing by the control unit 18 described above may be realized by, for example, JavaScript (registered trademark) or the like. Furthermore, in a case where the processing such as information processing by the control unit 18 described above is performed by a predetermined application, each unit of the control unit 18 may be realized by, for example, a predetermined application. For example, processing such as information processing by the control unit 18 may be realized by control information received from an external information processing apparatus. For example, in a case where the above-described display processing is performed by a predetermined application (for example, a remote meeting application or the like), the control unit 18 may include, for example, an application control unit that controls a predetermined application or a dedicated application.

1-5. Procedure of Information Processing According to an Embodiment

Next, a procedure of various types of information processing according to the embodiment will be described with reference to FIGS. 9 and 10.

1-5-1. Procedure of Processing Related to an Information Processing Apparatus First, a flow of processing related to the information processing apparatus will be described with reference to FIG. 9. FIG. 9 is a flowchart illustrating a processing procedure of the information processing apparatus according to the embodiment of the present disclosure. Specifically, FIG. 9 is a flowchart illustrating a procedure of information processing by the remote meeting server 100 which is an example of the information processing apparatus.

Figure 9:
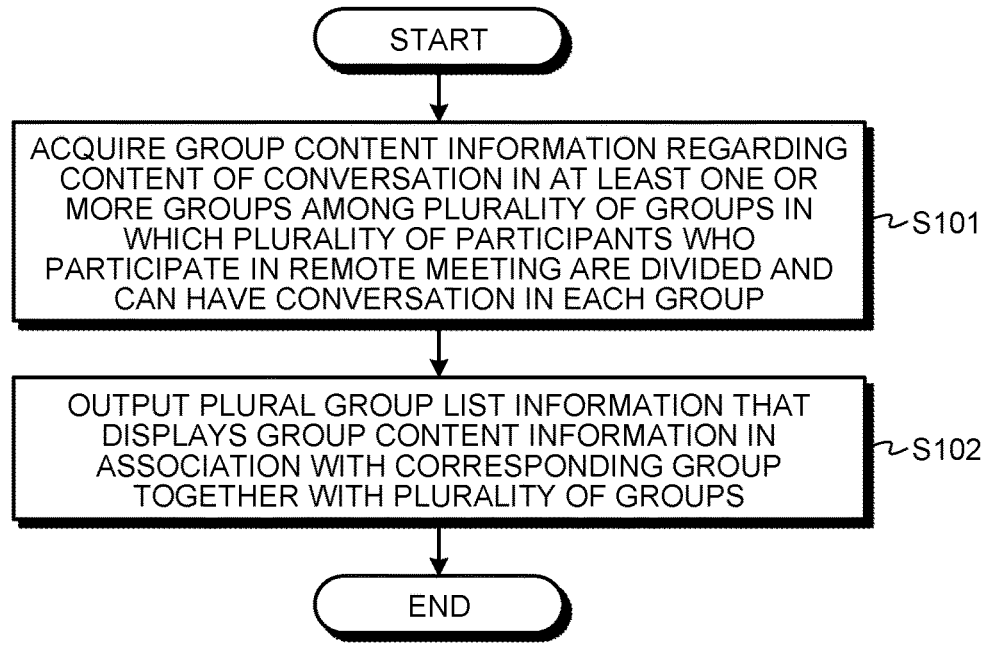
FIG. 9 is a flowchart illustrating a processing procedure of an information processing apparatus according to an embodiment of the present disclosure.

As illustrated in FIG. 9, the remote meeting server 100 acquires group content information regarding a content of a conversation in at least one or more groups among a plurality of groups in which a plurality of participants who participate in a remote meeting are divided and can have a conversation in each group (Step S101). The remote meeting server 100 transmits the plural group list information that displays the group content information in association with the corresponding group together with the plurality of groups (Step S102). For example, the remote meeting server 100 transmits, to the terminal device 10, the plural group list information for displaying the group content information in association with the corresponding group together with the plurality of groups. The terminal device 10 displays the plural group list information in which the group content information is displayed in association with the corresponding group together with the plurality of groups.

1-5-2. Procedure of Processing Related to a Group Work

Next, processing related to group work in the remote lecture system 1 will be described with reference to FIG. 10. FIG. 10 is a flowchart illustrating a processing procedure related to the group work. Note that, in the following, a case where the remote lecture system 1 performs processing will be described as an example, but the processing illustrated in FIG. 10 may be performed by any device such as the remote meeting server 100 and the terminal device 10 according to a device configuration included in the remote lecture system 1.

Figure 10:
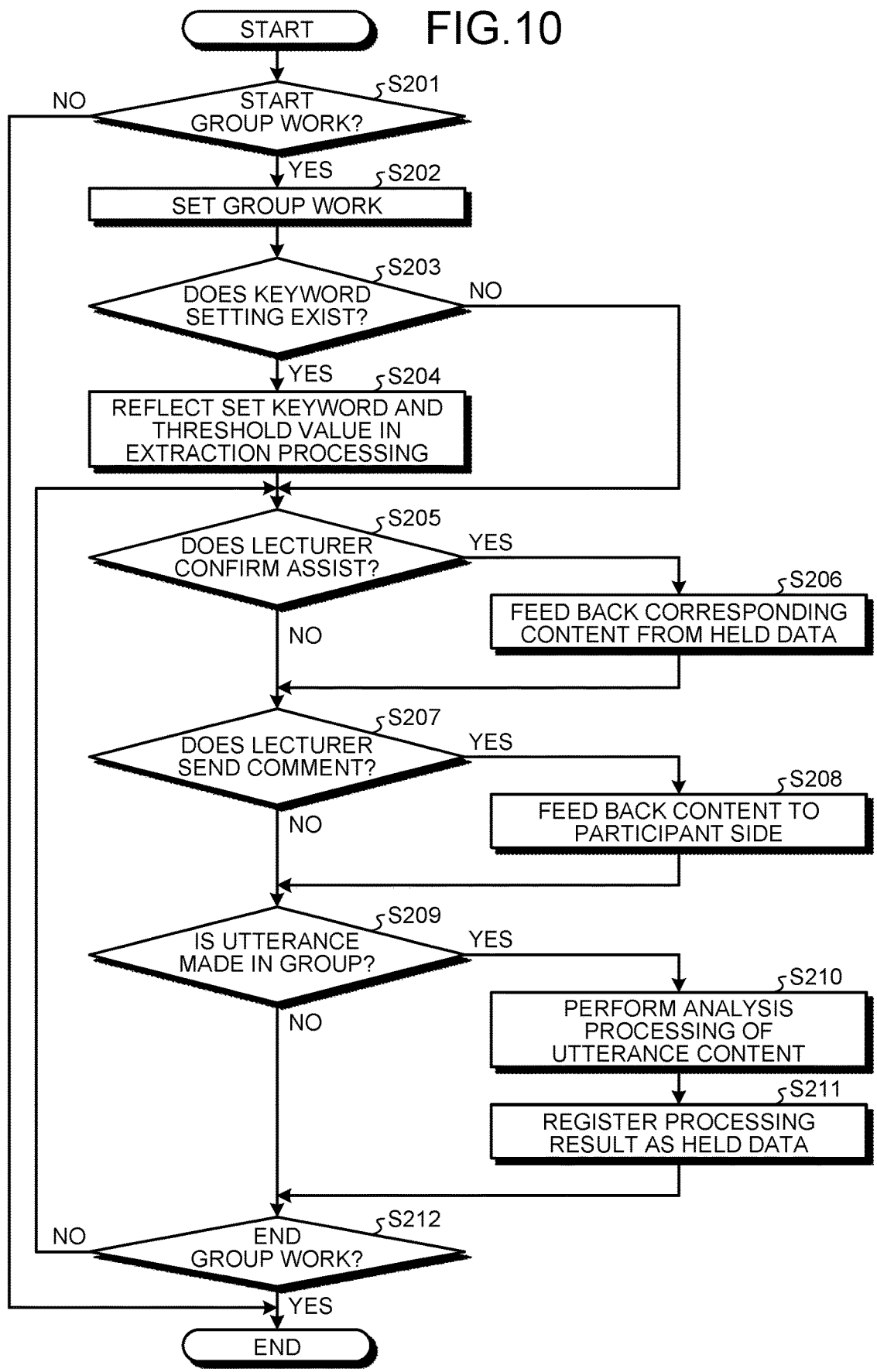
FIG. 10 is a flowchart illustrating a processing procedure related to a group work.

In FIG. 10, the remote lecture system 1 causes the process to branch according to whether or not the group work is started (Step S201). In a case where the remote lecture system 1 does not start the group work (Step S201: No), the remote lecture system 1 ends the process related to the group work.

Figure 22:
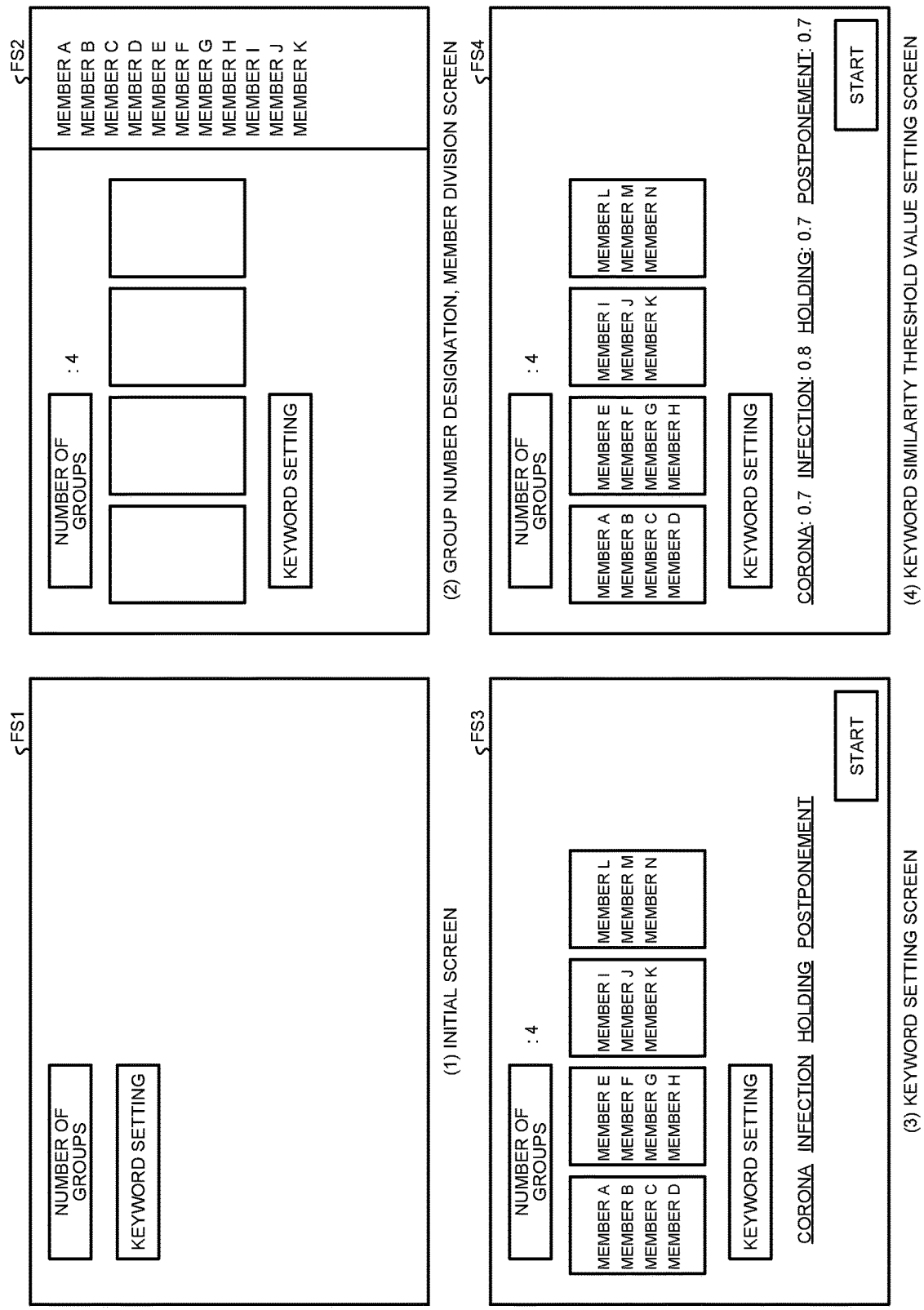
FIG. 22 is a diagram illustrating an example of a flow of setting a group work.

On the other hand, in a case where the group work is started (Step S201: Yes), the remote lecture system 1 sets the group work (Step S202). For example, when starting a group work, the remote lecture system 1 sets the group work as illustrated in FIG. 22.

Then, in a case where the keyword setting exists (Step S203: Yes), the remote lecture system 1 reflects the set keyword and threshold value in the extraction processing (Step S204), and performs processing of Step S205 and subsequent steps. On the other hand, in a case where no keyword setting exists (Step S203: No), the remote lecture system 1 performs the processing of Step S205 and subsequent steps without performing processing of Step S204.

Then, the remote lecture system 1 branches the processing according to whether or not the lecturer confirms the assist (Step S205). In a case where the lecturer confirms the assist (Step S205: Yes), the remote lecture system 1 feeds back the corresponding content from held data (Step S206), and performs processing of Step S207 and subsequent steps. For example, in Step S206, the remote meeting server 100 transmits the assist information to the terminal device 10 as feedback of the corresponding content from the held data.

On the other hand, in a case where the lecturer does not confirm the assist (Step S205: No), the remote lecture system 1 performs the processing of Step S207 and subsequent steps without performing the processing of Step S206.

Then, the remote lecture system 1 branches the processing according to whether or not the lecturer sends the comment (Step S207). In a case where the lecturer sends the comment (Step S207: Yes), the remote lecture system 1 feeds back the content to the participant side (Step S208), and performs the processing of Step S209 and subsequent steps. For example, in Step S208, the remote meeting server 100 transmits the comment of the lecturer to the member terminal 20 as feedback of the content to the participant side.

On the other hand, in a case where the lecturer does not send the comment (Step S207: No), the remote lecture system 1 performs the processing of Step S209 and subsequent steps without performing the processing of Step S208.

Then, the remote lecture system 1 branches the processing according to whether or not an utterance is made in the group (Step S209). In a case where an utterance is made in the group (Step S209: Yes), the remote lecture system 1 performs analysis processing of the utterance content (Step S210), and registers the processing result as held data (Step S211). Thereafter, the remote lecture system 1 performs the processing of Step S212 and subsequent steps. For example, in Steps S210 and S211, the remote meeting server 100 performs the analysis processing of the utterance content on the basis of the information of the utterance in the group, and registers the processing result as held data.

On the other hand, in a case where no utterance is made in the group (Step S209: No), the remote lecture system 1 performs the processing of S212 and subsequent steps without performing the processing of Steps S210 and S211.

The remote lecture system 1 branches the processing according to whether or not to end the group work (Step S212). For example, the remote lecture system 1 determines whether or not to end the group work using an arbitrary end condition such as a set time or a condition related to convergence of the group work. In a case of ending the group work (Step S212: Yes), the remote lecture system 1 ends the processing related to the group work.

On the other hand, in a case where the group work is not ended (Step S212: No), the remote lecture system 1 returns to Step S205 and repeats the processing.

1-6. Display Example

The display mode illustrated in FIG. 3 is merely an example, and the group content information may be displayed in various display modes. For example, the group content information which is the information of the overall grasp screen can be changed so that the log information can be further visually recognized. This point will be described below. Note that descriptions of the same points as those described above will be omitted as appropriate.

1-6-1. Distribution Graph

Figure 11:
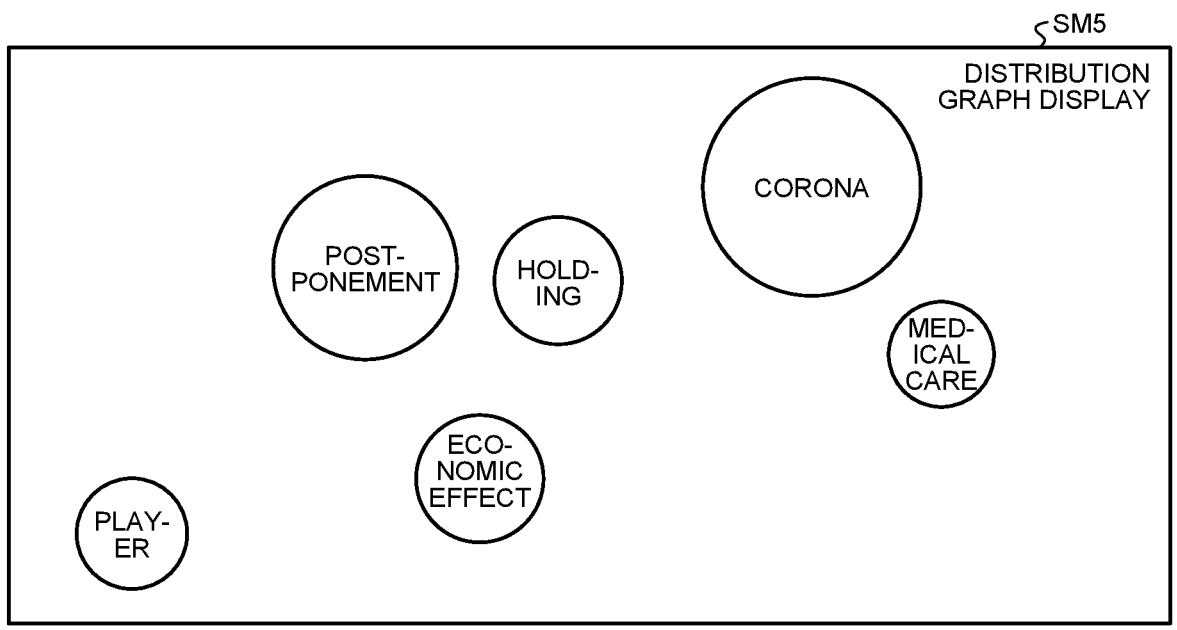
FIG. 11 is a diagram illustrating an example of display by a distribution graph.

First, the display in the distribution graph will be described with reference to FIG. 11. FIG. 11 is a diagram illustrating an example of display by a distribution graph.

The group content information SM5 illustrates an example of display of the group content information according to the display mode of the distribution graph. Each circle in the group content information SM5 indicates the number of appearances of the keyword displayed in the circle. That is, the larger the size of the circle, the larger the number of appearances of the keyword. Furthermore, the distance between the circles indicates a keyword similarity relationship. For example, a distance between circles of keywords having high similarity is shortened. The terminal device 10 displays the group content information SM5.

As illustrated in FIG. 11, the terminal device 10 may display the group content information not only in characters but also in a graph form. By changing the display, the terminal device 10 can allow the administrator to easily (intuitively) grasp whether the discussion diverges or is gathered in the group, whether there is a difference in the degree of progress with another group, and the like.

In the distribution graph display of FIG. 11, the number of appearances of the extracted keywords is expressed in the size of a circle, and word vectors of the respective keywords are projected, so that words having a potentially close relationship are expressed in a form in which circles are close to each other. As a result, the administrator can grasp the contents of the graphical discussion. By checking these pieces of information, the administrator can smoothly perform facilitation.

1-6-2. Frequency Time Series

Figure 12:
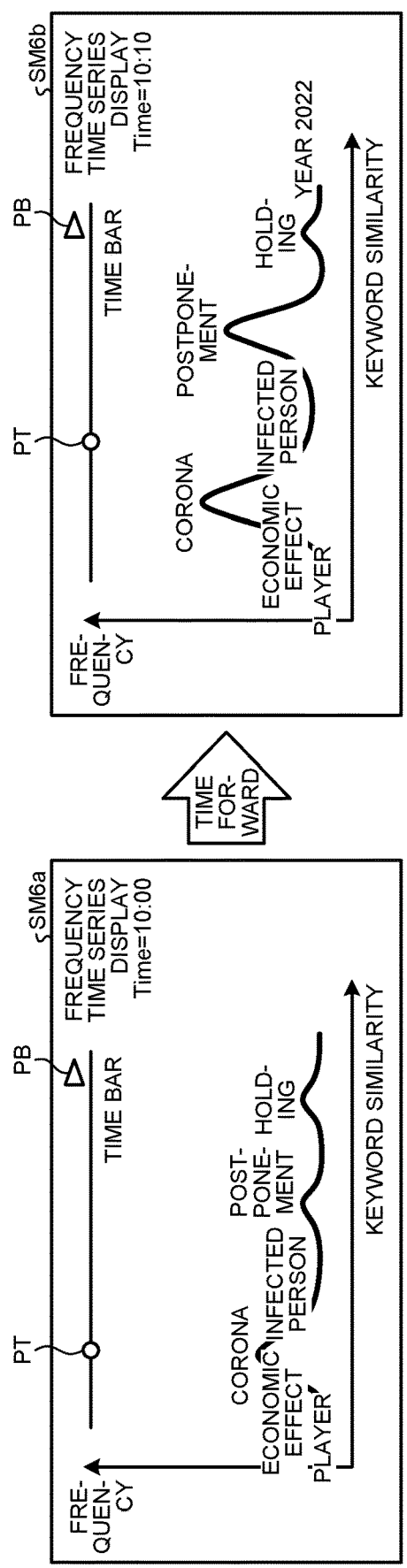
FIG. 12 is a diagram illustrating an example of display by frequency time series.

Next, display in frequency time series will be described with reference to FIG. 12. FIG. 12 is a diagram illustrating an example of display by frequency time series.

The group content information SM6a indicates the number of appearances (frequency) of each keyword at the time point (10:00) corresponding to the point PT displayed on the time bar. The waveform of the group content information SM6a indicates the frequency of each keyword. That is, the frequency of the keyword arranged on the wave is indicated. The higher the position of the waveform, the larger the number of appearances of the keyword. Furthermore, each keyword is arranged on the basis of a similarity relationship. For example, keywords having high similarity are arranged at close positions. The terminal device 10 displays the group content information SM6a.

The terminal device 10 can time-forward and display the group content information SM6a according to an operation of a user such as an administrator. For example, the administrator who uses the terminal device 10 may perform time forwarding (reproduction) by selecting the reproduction button PB or the like, or may perform the time forwarding by moving the point PT. FIG. 12 illustrates a display example after the group content information SM6b is time-forwarded from the group content information SM6a.

The group content information SM6b indicates the number of appearances (frequency) of each keyword at the time point (10:10) corresponding to the point PT moved by the administrator who uses the terminal device 10. The other points are similar to those of the group content information SM6a. FIG. 12 illustrates that the group content information SM6b has a higher corona and postponement frequency than the group content information SM6a.

As illustrated in FIG. 12, the terminal device 10 may display the group content information such that a change with time can be confirmed. As a result, the terminal device 10 can cause the administrator to easily (intuitively) grasp the situation change in the group.

In the frequency time series display of FIG. 12, the remote lecture system 1 provides a diagram in which the type of the extracted keyword and the appearance frequency of the keyword can be easily grasped. Furthermore, the frequency time series display in FIG. 12 has a function capable of confirming a transition due to a time change, and the administrator such as a lecturer can confirm what kind of discussion flow is being performed by performing time forwarding (reproduction button). By checking these pieces of information, the administrator can smoothly perform facilitation.

In the frequency time series display of FIG. 12, the administrator can grasp whether the discussion contents of the entire group converge or diverge by referring to each display. For example, in a case where various keywords are widely dispersed, it can be seen that the discussion is widened. Furthermore, in a case where only one or surrounding keywords are intensively frequently used, it can be understood that the discussion is focused on a certain theme.

1-6-3. Radar Chart

Figure 13:
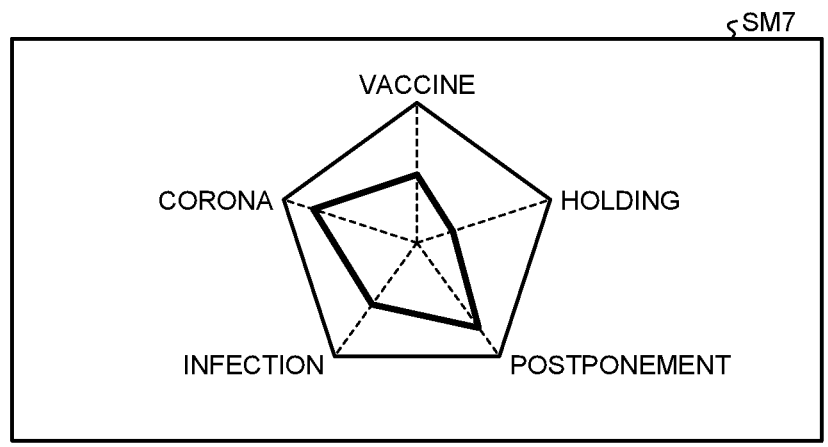
FIG. 13 is a diagram illustrating an example of display by a radar chart.

Next, display on a radar chart will be described with reference to FIG. 13. FIG. 13 is a diagram illustrating an example of display by the radar chart.

The group content information SM7 indicates an example of display of the group content information according to the display mode of the radar chart. The group content information SM7 shows a radar chart for five keywords of corona, vaccine, holding, postponement, and infection. The larger the value corresponding to each keyword, the larger the number of appearances of the keyword. The terminal device 10 displays the group content information SM7.

As illustrated in FIG. 13, by displaying the terminal device 10 in the form of a radar chart, it is possible to allow the administrator to easily (intuitively) grasp whether the discussion diverges or is gathered in the group, whether there is a difference in the degree of progress with another group, and the like.

1-6-4. Line Graph

Figure 14:
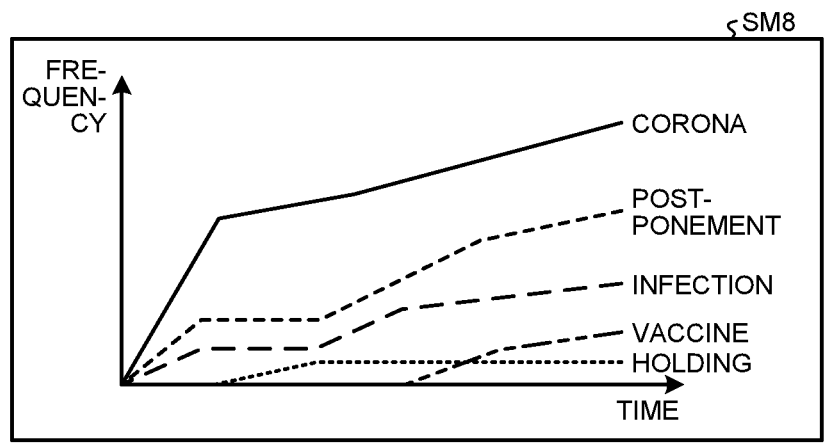
FIG. 14 is a diagram illustrating an example of display by a line graph.

Next, the display in a line graph will be described with reference to FIG. 14. FIG. 14 is a diagram illustrating an example of display by a line graph.

The group content information SM8 illustrates an example of display of the group content information according to the display mode of the line graph. The group content information SM8 shows a line graph for five keywords of corona, vaccine, holding, postponement, and infection. The larger the value corresponding to each keyword, the larger the number of appearances of the keyword. The terminal device 10 displays the group content information SM8.

As illustrated in FIG. 14, the terminal device 10 can display the group content information such that a change with time can be confirmed by displaying the group content information in the form of a line graph. As a result, the terminal device 10 can cause the administrator to easily (intuitively) grasp the situation change in the group.

1-6-5. Pie Chart

Figure 15:
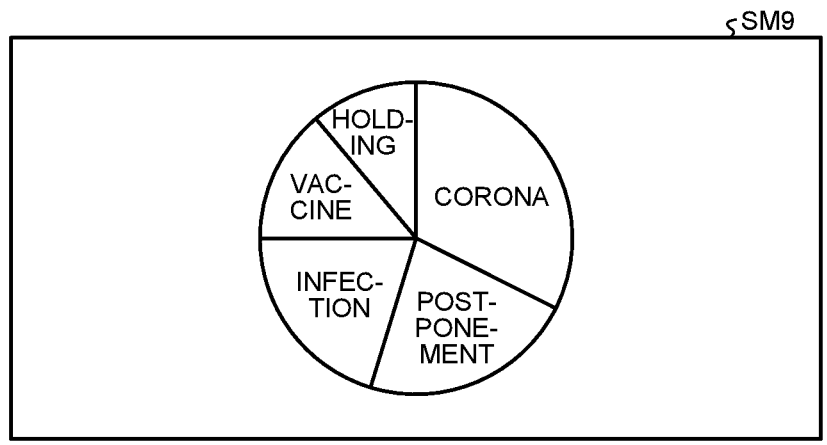
FIG. 15 is a diagram illustrating an example of display by a pie chart.

Next, display in a pie chart will be described with reference to FIG. 15. FIG. 15 is a diagram illustrating an example of display by a pie chart.

The group content information SM9 illustrates an example of display of the group content information according to the display mode of the pie chart. The group content information SM9 shows a pie chart for five keywords of corona, vaccine, holding, postponement, and infection. The larger the ratio of the region corresponding to each keyword (the larger the angle), the larger the number of appearances of the keyword. The terminal device 10 displays the group content information SM9.

As illustrated in FIG. 15, by displaying in the form of a pie chart, the terminal device 10 can cause the administrator to easily (intuitively) grasp whether the discussion is emanating or converging in the group, whether there is a difference in the degree of progress with another group, and the like.

1-6-6. Bar Graph

Figure 16:
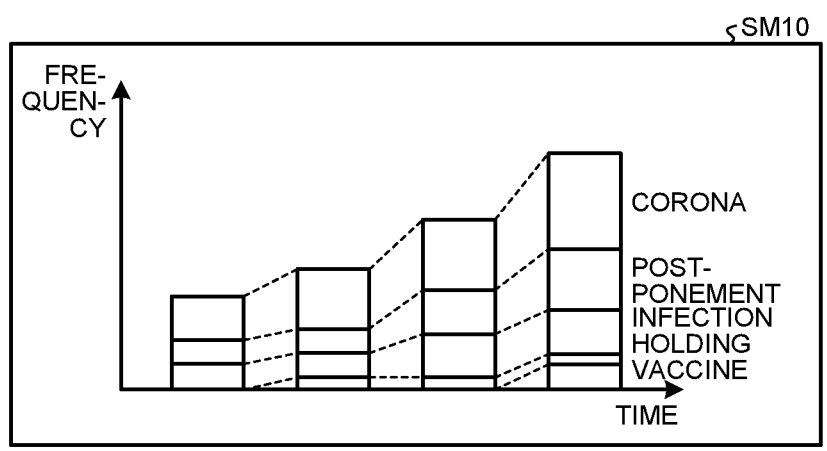
FIG. 16 is a diagram illustrating an example of display by a bar graph.

Next, display in a bar graph will be described with reference to FIG. 16. FIG. 16 is a diagram illustrating an example of display by a bar graph.

The group content information SM10 illustrates an example of display of the group content information according to the display mode of the bar graph. The group content information SM10 shows bar graphs for 5 keywords of corona, vaccine, holding, postponement, infection. The larger the ratio of the region corresponding to each keyword, the larger the number of appearances of the keyword. The terminal device 10 displays the group content information SM10.

As illustrated in FIG. 16, the terminal device 10 can display the group content information such that a change with time can be confirmed by displaying a plurality of bar graphs arranged along time. As a result, the terminal device 10 can cause the administrator to easily (intuitively) grasp the situation change in the group.

1-7. Processing Example

From here, a processing example according to the operation by the lecturer, which is an example of the administrator, and the like will be described with reference to FIG. 2 and the like. The remote lecture system 1 performs corresponding processing according to an operation or the like by a lecturer.

Figure 17:
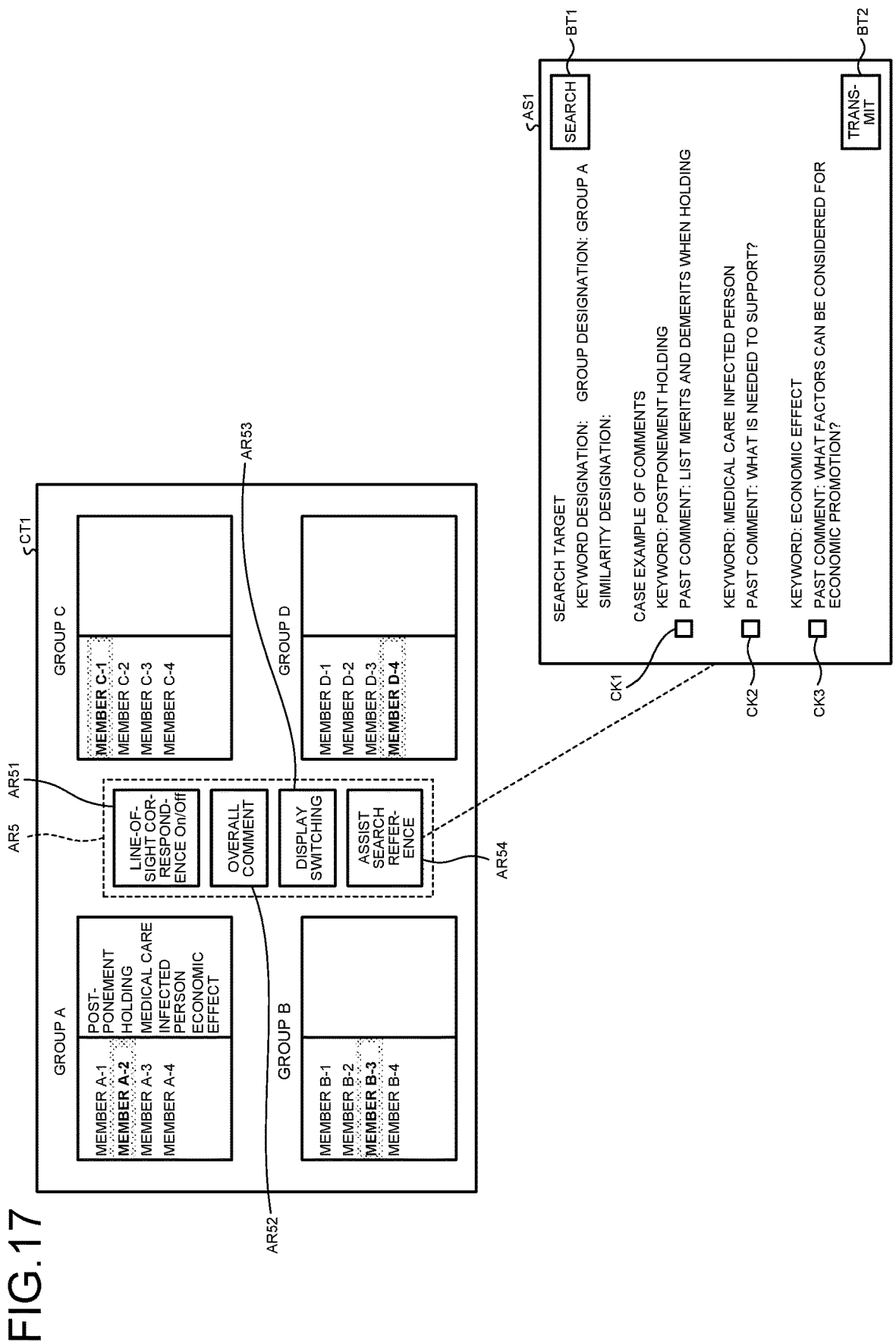
FIG. 17 is a diagram illustrating an example of plural group list information and assist information.

In a case where the lecturer confirms the progress of each group, the lecturer confirms the discussion content of each group using the plural group list information CT which is the overall grasp screen. This point will be described with reference to FIG. 17. FIG. 17 is a diagram illustrating an example of the plural group list information and the assist information.

As illustrated in FIG. 17, an area AR5 which is an operation UI area of the plural group list information CT includes a plurality of operation buttons AR51 to AR54. The terminal device 10 receives an operation of the lecturer on the plurality of operation buttons AR51 to AR54 and the like. The operation button AR51 described as "line-of-sight correspondence On/Off" indicates whether or not to accept input by a line of sight. Note that a case of receiving an input by a line of sight will be described later.

Furthermore, an operation button AR52 described as "overall comment" is a button for transmitting a comment to all the members of all the groups. In a case of sending the comment to the entire group, the lecturer can collectively send the comment to all the groups by selecting the operation button AR52.

For example, in a case where the lecturer selects the operation button AR52, the terminal device 10 transmits, to the remote meeting server 100, comment transmission information including the comment of the lecturer, designation information indicating that the transmission destination of the comment is all groups (that is, all members), and character information indicating the comment to be transmitted to the members of all groups. The remote meeting server 100 that has received the comment transmission information from the terminal device 10 transmits the comment indicated by the comment transmission information to the member terminals 20 of the members of all the groups.

As a result, the remote lecture system 1 can quickly provide information on contents common to all participants and time management to all participants.

Furthermore, an operation button AR53 indicated as "display switching" is a button for switching the display. In a case of switching the display content of the plural group list information CT1, the lecturer can switch the display content of the plural group list information CT1 by selecting the operation button AR53. For example, the lecturer designates a target group (target group) from the groups A to D, and selects the operation button AR53 to switch the display mode of the group content information of the target group. For example, when the lecturer selects any one of the areas AR1 to AR4 in the plural group list information CT1, the terminal device 10 receives the selection as the operation of designating the target group.

For example, when the lecturer designates the group A as the target group and selects the operation button AR53, the terminal device 10 switches the display mode of the group content information SM1 of the group A. For example, in a case where the group content information SM1 is displayed in the keyword/summary display, the terminal device 10 switches the display mode of the group content information SM1 to the frequency time series, the distribution graph, or the like according to the selection of the operation button AR53. Note that the terminal device 10 may sequentially switch the display mode in a predetermined order according to the selection of the operation button AR53, or may receive designation as to which display mode to switch from the lecturer.

1-7-1. Assist and Comment Examples

Figure 18:
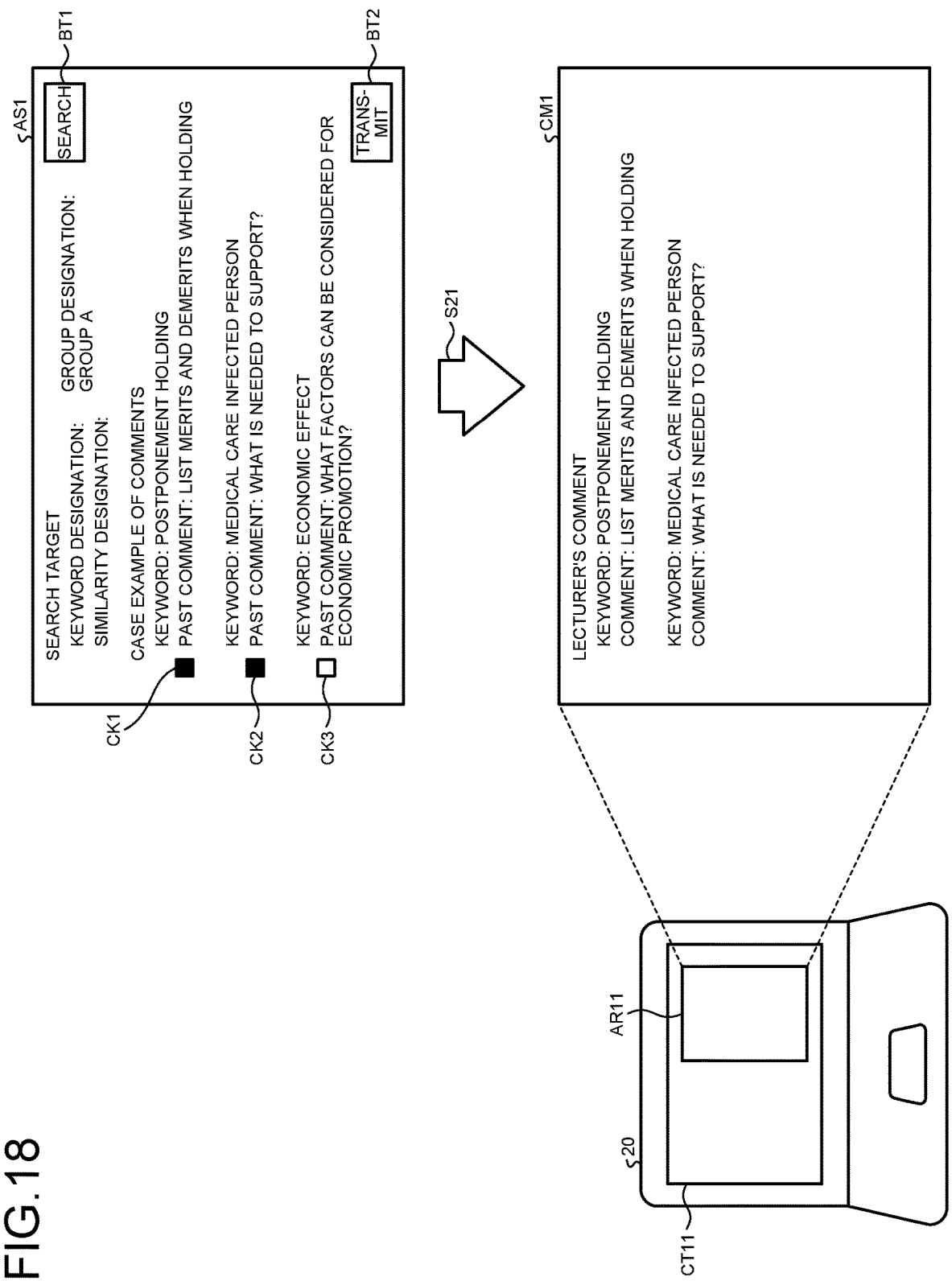
FIG. 18 is a diagram illustrating an example of providing a comment using assistance.
Figure 19:
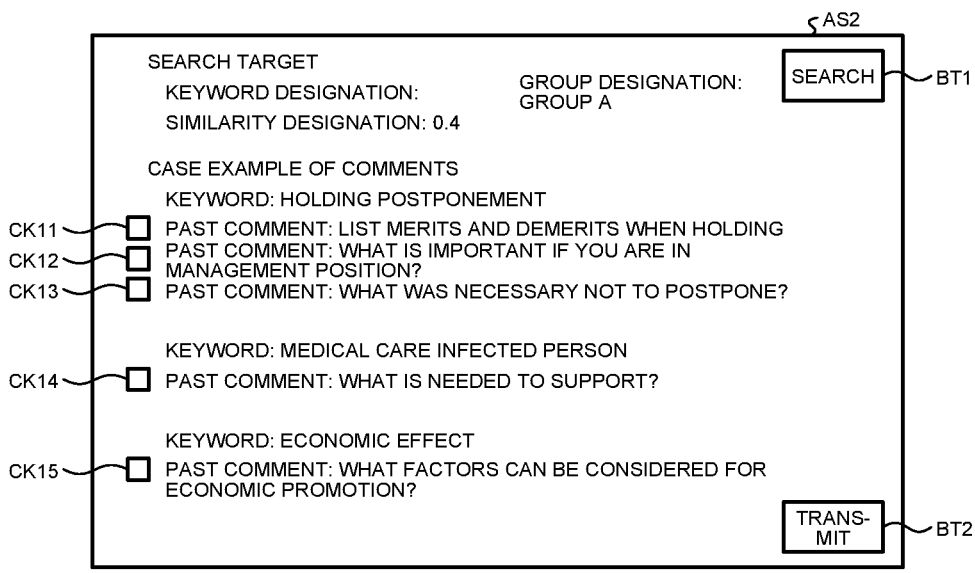
FIG. 19 is a diagram illustrating another example of contents of assistance.

Various processing related to the assist will be described below with reference to FIGS. 17 to 19. FIG. 18 is a diagram illustrating an example of providing a comment using assistance. FIG. 19 is a diagram illustrating another example of the content of the assist.

As described above, the remote lecture system 1 can hold the contents discussed in the lecture, the brainstorming, or the like so far in the history information storage unit 123 or the like, for example. The remote lecture system 1 can perform the assist to an administrator such as a lecturer by using the held data. The assist is performed by searching past content similar to what is currently discussed and providing what is being discussed as current assistance. Note that, in the remote lecture system 1, the assistance to the member side such as the participant can be controlled by the lecturer side.

An operation button AR54 written as "assist search reference" in the area AR5 is a button for the lecturer to receive the assist of the comment. In a case where the lecturer receives the assist of the comment, the lecturer can search the comment record for the discussion from the past log information by selecting the operation button AR54, and can receive the assist on the basis of the search result. For example, the remote meeting server 100 generates information (also referred to as "assist information") for assisting the administrator such as the lecturer, and transmits the generated assist information to the terminal device 10. This point will be described below.

By designating the group, it is possible to select whether to perform the search using the keyword extracted in the group, whether to perform the search by designating the keyword itself by the lecturer, or to perform the search using both of them. The remote lecture system 1 performs a search according to the selection of the lecturer. For example, the lecturer designates a group (target group) to be assisted. As a result, the remote lecture system 1 searches on the basis of the information of the target group to be assisted.

In a case where the lecturer selects the operation button AR54, the terminal device 10 displays information for designating a search target such as keyword designation, similarity designation, and group designation. For example, the terminal device 10 displays information other than the case example of comments which is the search result (assist information) among the information indicated in the search information AS1. After inputting the information to be designated, the lecturer requests the remote meeting server 100 to perform a search by selecting a search button BT1 in the search information AS1.

The terminal device 10 requests the remote meeting server 100 to perform a search based on the keyword, the similarity, the group, and the like designated by the lecturer. In response to selection of the search button BT1 in the search information AS1, the terminal device 10 transmits designation information indicating the keyword, the similarity, the group, and the like designated by the lecturer to the remote meeting server 100, thereby requesting the remote meeting server 100 to perform search.

Note that no keyword, similarity, or group may be designated. For example, in a case where no keyword is designated, the remote meeting server 100 may extract (select) a keyword on the basis of a conversation in all groups and perform a search on the basis of the keyword. For example, in a case where the keyword is not designated, the remote meeting server 100 may determine the keyword on the basis of the agenda of the group work and perform the search on the basis of the keyword. For example, the remote meeting server 100 may determine a keyword corresponding to the agenda of the group work using the information of the keyword list associated with the agenda, and perform search on the basis of the keyword. Furthermore, for example, in a case where no keyword is designated and a group is designated, the remote meeting server 100 may extract (select) a keyword on the basis of a conversation in the designated group, and perform search on the basis of the keyword. Note that the above is merely an example, and the remote meeting server 100 may determine the keyword using various information.

Furthermore, for example, in a case where the similarity is not designated, the remote meeting server 100 performs search using a predetermined setting value (default value) as a threshold value. In a case where the similarity is designated, the remote meeting server 100 performs search using the designated similarity as a threshold value. For example, in a case where the group is not designated, the remote meeting server 100 performs search using a default value (for example, 0.6 or the like) as a similarity threshold value on the basis of the designated keyword or the conversations of all the groups. In FIG. 12, the terminal device 10 requests to perform the search on the basis of the conversation of the group A by transmitting the information designating the group A.

The remote lecture system 1 calculates the similarity of the keyword information and the summary content, searches for a comment example that can be a reference from the past data, and feeds back the comment example to the lecturer. For example, the remote meeting server 100 searches for past comments (past comments) in the history information storage unit 123. The remote meeting server 100 performs a search using a designated keyword, a keyword extracted from a conversation of a designated group, or the like as a search query (target keyword). In FIG. 17, for example, the remote meeting server 100 extracts keywords such as "postponement", "holding", "medical care", "economic", and the like on the basis of the conversation of the group A. The remote meeting server 100 may use the designated keywords "postponement", "holding", "medical care", "economic", and the like.

For example, the remote meeting server 100 calculates the similarity between the keyword associated with each past comment in the history information storage unit 123 and the search query (target keyword), and extracts the past comment of which the calculated similarity is greater than or equal to a threshold value. For example, the remote meeting server 100 vectorizes each keyword, and calculates cosine similarity between the vectors of the keywords as similarity between the keywords. For example, the remote meeting server 100 converts keywords into vectors using an arbitrary model (vector conversion model) such as Word2Vec or a bag of words (BoW). The remote meeting server 100 extracts the past comment associated with the keyword whose similarity with the search query (target keyword) is equal to or greater than a threshold value. Note that the above is merely an example, and the remote meeting server 100 may calculate the similarity by appropriately using various types of information.

In FIG. 17, the remote meeting server 100 extracts past comments such as "List merits and demerits when holding", "What is needed to support?", and "What factors can be considered for economic promotion?". For example, the remote meeting server 100 extracts past comments "List merits and demerits when holding" associated with the keywords "postponement" and "holding". Furthermore, the remote meeting server 100 extracts the past comment "What is needed to support?" associated with the keywords "medical care" and "infected person". Furthermore, the remote meeting server 100 extracts the past comment "What factors can be considered for economic promotion?" associated with the keyword "economic effect".

Then, the remote meeting server 100 transmits the extracted past comment to the terminal device 10 as assist information. The remote meeting server 100 transmits search information AS1 including the extracted past comment as assist information to the terminal device 10. The terminal device 10 that has received the search information AS1 displays the search information AS1. As a result, the lecturer can confirm the past comment provided as the assist information. The lecturer can obtain information from the searched result (assist information), generate a comment for the group, and provide the comment to the group.

Note that, in the remote lecture system 1, the lecturer can transmit the comment to the group using the assist information as it is. In the remote lecture system 1, the lecturer side can control information to be sent to the group with a check box or the like. In the remote lecture system 1, the comment candidate designated in the check box is actually transmitted to the group as a comment.

An example of this point will be described with reference to FIG. 18. In the example of FIG. 18, the lecturer selects a check box CK1 corresponding to the past comment "List merits and demerits when holding" and a check box CK2 corresponding to the past comment "What is needed to support?". As described above, FIG. 18 illustrates a case where the check boxes CK1 and CK2 are selected among the check boxes CK1 to CK3. As a result, the terminal device 10 selects the past comment "List merits and demerits when holding" and the past comment "What is needed to support?" as the comment to be transmitted.

After designating the comment to be transmitted, the lecturer requests the remote meeting server 100 to transmit the comment to be transmitted by selecting the transmission button BT2 in the search information AS1.

The terminal device 10 requests the remote meeting server 100 to transmit the comment to be transmitted designated by the lecturer. In response to selection of the transmission button BT2 in the search information AS1, the terminal device 10 transmits designation information indicating the comment to be transmitted, the group, and the like designated by the lecturer to the remote meeting server 100, thereby requesting the remote meeting server 100 to transmit the comment. In FIG. 18, the terminal device 10 requests the remote meeting server 100 to transmit two comments of the past comment "List merits and demerits when holding" corresponding to the check box CK1 and the past comment "What is needed to support?" corresponding to the check box CK2 to the group A.

In response to the request from the terminal device 10, the remote meeting server 100 transmits the comment to the member terminal 20 used by the member of the group (Step S21). The remote meeting server 100 transmits the two comments of the past comment "List merits and demerits when holding" and the past comment "What is needed to support?" to the member terminal 20 of the group A as comments from the lecturer. In FIG. 18, the remote meeting server 100 transmits the comment information CM1 indicating two lecturer comments of "List merits and demerits when holding" and "What is needed to support?" to the member terminal 20 of the group A. The member terminal 20 that has received the comment information CM1 displays the comment information CM1.

As a result, the remote lecture system 1 can facilitate the comment by the administrator such as the lecturer to the member. Therefore, in the remote lecture system 1, even in a case where the lecturer is a new lecturer, it is possible to provide a group work close to an expert lecturer. In the remote lecture system 1, the lecturer himself/herself can learn by referring to the comments made by the past lecturer using the past data. For example, in the remote lecture system 1, when the lecturer learns, the content of the registration data can be referred by designating the keyword of the "assist search reference" without performing the group work.

Here, a case where the lecturer designates the similarity will be described with reference to FIG. 19. Note that description of the same points as those described above will be omitted as appropriate.

In FIG. 19, the terminal device 10 designates the similarity threshold value as "0.4", and transmits information designating the group A, thereby requesting the remote meeting server 100 to perform search with the threshold value set to "0.4" on the basis of the conversation of the group A. The remote meeting server 100 transmits search information AS2 including the extracted past comment as assist information to the terminal device 10. The terminal device 10 that has received the search information AS2 displays the search information AS2.

As indicated in the search information AS2, in a case where the similarity threshold value is designated as "0.4", five past comments, which are more than three in a case where the search is performed with the default value indicated in the search information AS1, are extracted. As described above, in the remote lecture system 1, the lecturer can obtain feedback of more candidates by lowering the threshold value of the similarity.

In FIG. 19, the remote meeting server 100 extracts past comments such as "List merits and demerits when holding", "What is needed to support?", and "What factors can be considered for economic promotion?". For example, the remote meeting server 100 extracts past comments "List merits and demerits when holding", "What is important if you are in a management position?", and "What was necessary not to postpone?" associated with the keywords "postponement" and "holding". Furthermore, the remote meeting server 100 extracts the past comment "What is needed to support?" associated with the keywords "medical care" and "infected person". Furthermore, the remote meeting server 100 extracts the past comment "What factors can be considered for economic promotion?" associated with the keyword "economic effect".

The lecturer selects a comment to be transmitted to the member by selecting a check box corresponding to the past comment to be the comment to be transmitted among the check boxes CK11 to CK15. The remote lecture system 1 provides the member with the comment to be transmitted as the comment of the lecturer according to the selection of the lecturer.

1-7-2. Data Example

Figure 20:
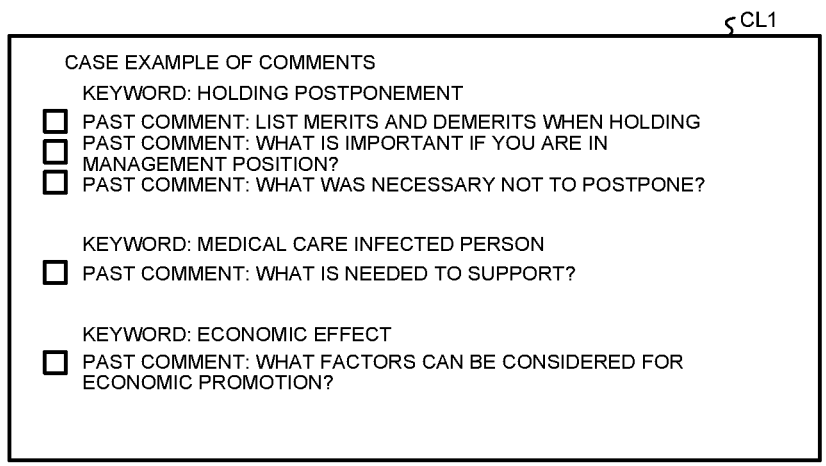
FIG. 20 is a diagram illustrating an example of assist contents.

Here, an example of data will be described. First, an example of information provided as assistance will be described with reference to FIG. 20. FIG. 20 is a diagram illustrating an example of the assist contents. The assist contents as illustrated in FIG. 20 are generated by the remote meeting server 100 on the basis of information such as a lecturer side data holding list. For example, the comment list CL1 in FIG. 20 is generated from past comments in the history information storage unit 123. The remote meeting server 100 extracts the past comment from the history information storage unit 123 and generates a comment list CL1 using the extracted past comment. Since the past comment illustrated in the comment list CL1 is similar to the past comment illustrated in the search information AS2 of FIG. 19, the description thereof will be omitted.

Next, an example of keywords and information provided as summary contents will be described with reference to FIG. 21. FIG. 21 is a diagram illustrating an example of keywords and summary contents. FIG. 21 illustrates, as an example, a case where four keywords "postponement", "holding", "corona", and "medical care" designated by a lecturer are targeted for the discussion regarding the 2021 Olympics.

A dialogue log DA1 of FIG. 21 illustrates a flow of dialogue in a group between 10:00 and 10:10 for the discussion about the 2021 Olympics. For example, the remote meeting server 100 collects information indicated in the dialogue log DA1. Then, the remote meeting server 100 generates list information of the keyword and the summary content associated with the time as illustrated in dialogue summary data DT1 on the basis of the dialogue log DA1 (Step S31). The dialogue summary data DT1 indicates an example of a holding list of the participant side data. The remote meeting server 100 generates the dialogue summary data DT1 by analyzing the dialogue log DA1 for four keywords "postponement", "holding", "corona", and "medical care" designated by the lecturer. For example, the remote meeting server 100 stores the dialogue log DA1 and the dialogue summary data DT1 in the storage unit 120.

1-7-3. Group Work Setting Example

Here, an example of the group work setting will be described with reference to FIG. 22. FIG. 22 is a diagram illustrating an example of a flow of setting a group work. FIG. 22 illustrates, as an example, a case where a lecturer starts the group work.

A first screen FS1 in FIG. 22 illustrates an initial screen. The lecturer operates the terminal device 10 on which the first screen FS1 is displayed to set the number of groups and keywords. A second screen FS2 in FIG. 22 indicates a screen on which the number of groups (In the case of FIG. 22, four) is designated and on which member division is performed. The lecturer operates the terminal device 10 on which the second screen FS2 is displayed to assign a member to each group.

A third screen FS3 in FIG. 22 illustrates a screen for setting a keyword. The lecturer operates the terminal device 10 on which the third screen FS3 is displayed to set the keyword. A fourth screen FS4 in FIG. 22 is a screen for setting a threshold value of keyword similarity. The lecturer operates the terminal device 10 on which the fourth screen FS4 is displayed to set the similarity of the keywords.

In the remote lecture system 1, when starting a group work, the lecturer can designate the number of groups, members to be included in the group, and keywords to be extracted (picked up) in the group work. In the remote lecture system 1, the keyword is not an essential designation item. In a case where no designation is made, the remote lecture system 1 automatically handles proper nouns and common nouns captured as keywords. In a case where a keyword is designated, the remote lecture system 1 selects and extracts a word similar to the designated keyword (a similar word obtained using a degree of similarity using a word vector or the like) with the designated keyword as a center. In a case where the keyword is designated, the remote lecture system 1 can also set a threshold value for determination as a similar word.

Note that FIG. 22 is merely an example, and an arbitrary setting mode can be adopted for the setting of the group work. For example, in the remote lecture system 1, a plurality of members participating in a group work may be automatically divided into a plurality of groups. Furthermore, after the division into the groups, the member may change the group to which the member belongs.

1-8. Operation Example (Line of Sight)

Figure 23:
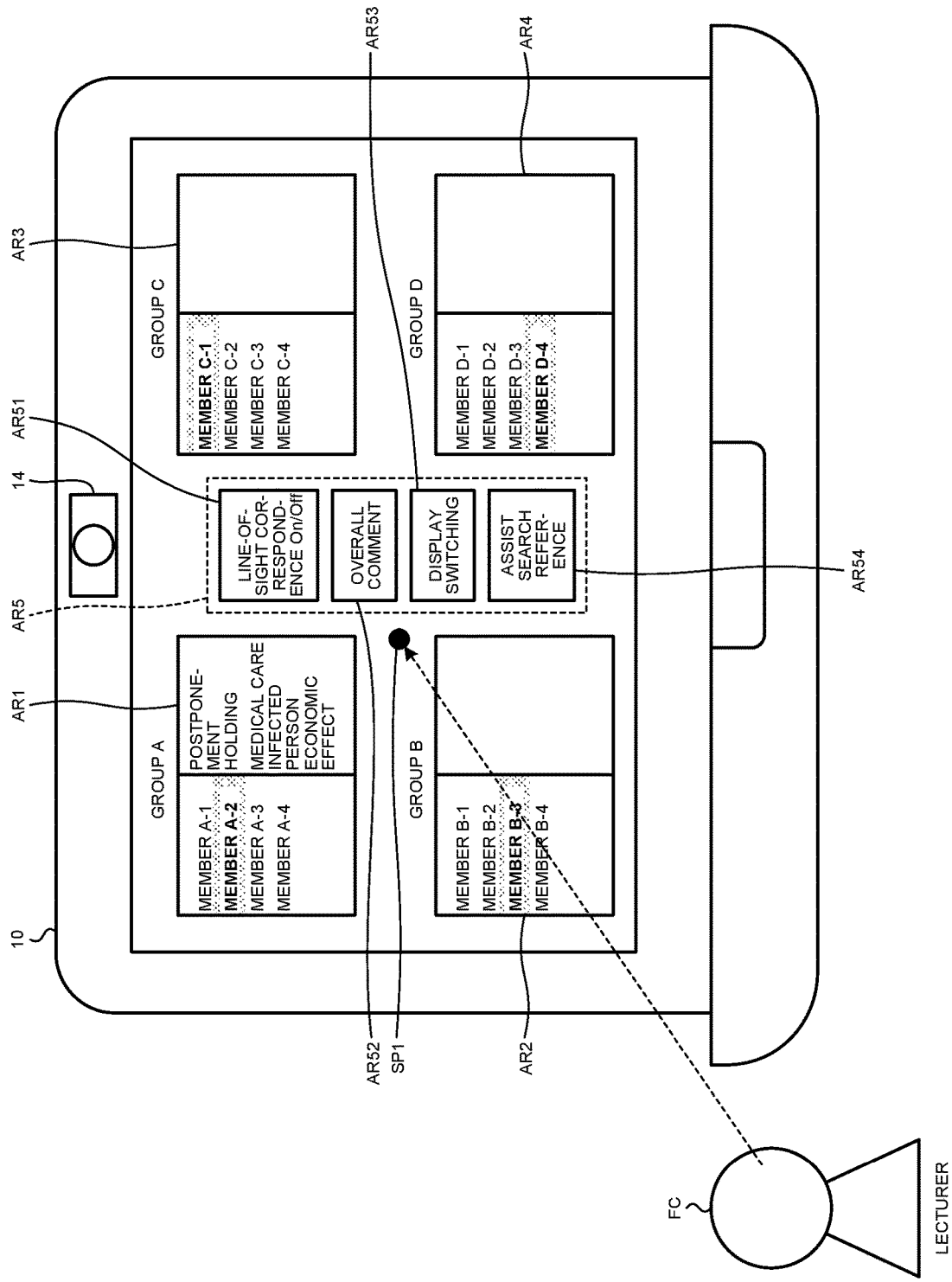
FIG. 23 is a diagram illustrating an example of input of an operation by a line of sight.
Figure 24:
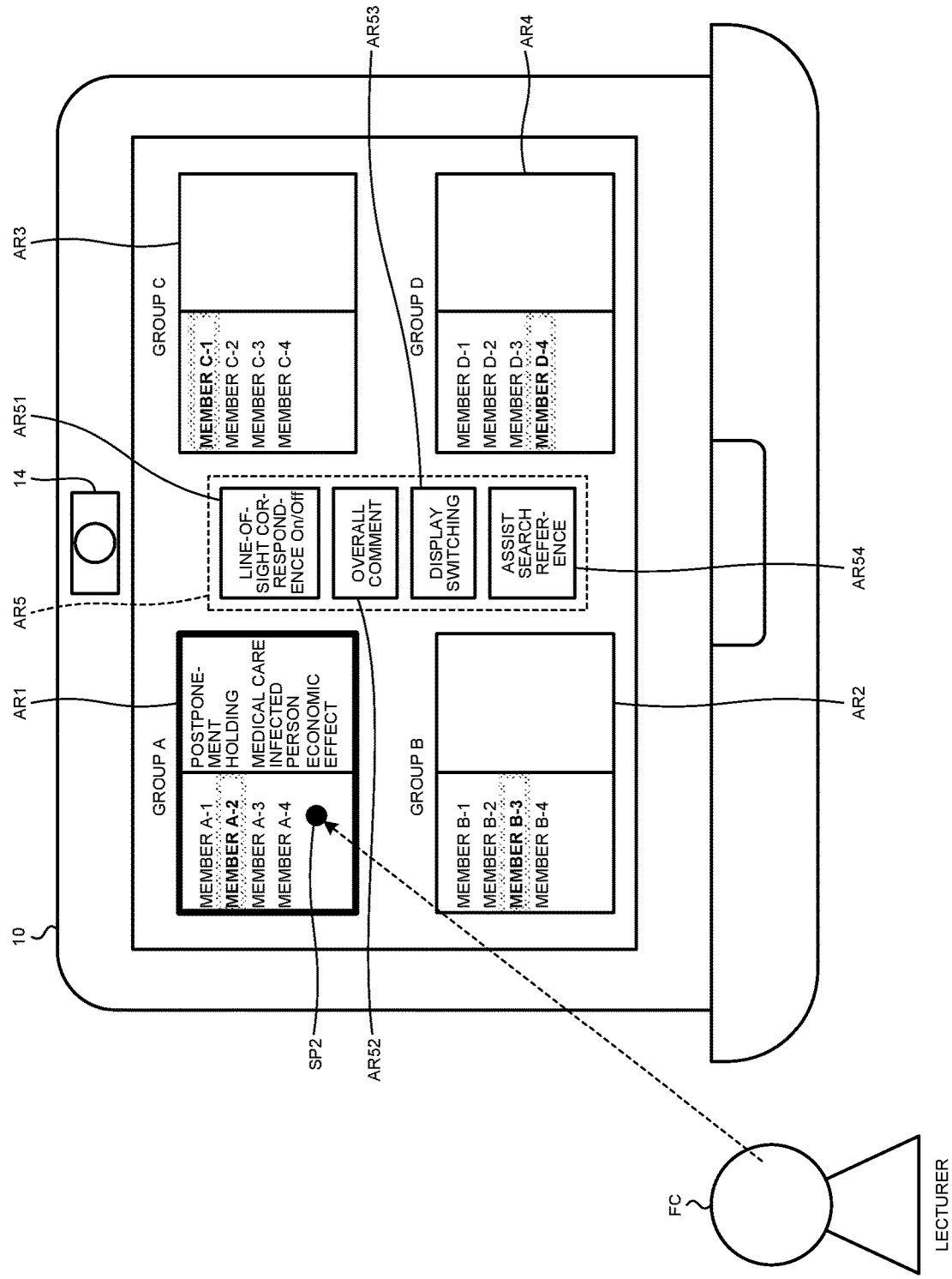
FIG. 24 is a diagram illustrating an example of input of an operation by a line of sight.

The operation on the terminal device 10 is not limited to the above-described keyboard, mouse, touch panel, voice input, and the like, and may be received by various input modes. For example, the terminal device 10 may receive an operation by the line of sight of the operator (user). Regarding the designation of the operation buttons and the like, designation using a line of sight is also possible. This point will be described with reference to FIGS. 23 and 24. FIGS. 23 and 24 are diagrams illustrating an example of a display mode. Note that description of the same points as those described above will be omitted as appropriate.

In FIG. 23, the line-of-sight information on a line of sight of the lecturer FC is acquired from the camera 14, and a pointer SP1 indicating a gaze point of the line of sight of the lecturer FC is displayed on the screen of the terminal device 10 based on the line-of-sight information. For example, the terminal device 10 displays the pointer SP1 superimposed on the overall grasp screen.

In the remote lecture system 1, various processes are executed according to the position of the pointer SP1, which is the line-of-sight pointer of the lecturer FC. For example, in the remote lecture system 1, when the pointer SP1 is included in the area of any group, the voice of the lecturer FC is transmitted to the member terminal 20 of the group in which the pointer SP1 is located.

In the remote lecture system 1, the comment may be sent from the lecturer FC to the group on the basis of the line-of-sight information of the lecturer FC. An example of this point will be described with reference to FIG. 24. For example, the lecturer FC moves a position of a pointer SP2, which is the line-of-sight pointer, into the area AR1 of the group A, and utters the comment in a state where the area AR1 of the group A is selected (feedback such as highlight of the frame of the area AR1 is performed), so that the content is sent to the group A. For example, in a case where the lecturer FC utters while the pointer SP2 is located in the area AR1 of the group A, the terminal device 10 transmits the utterance information and designation information indicating that the designated group is the group A to the remote meeting server 100. The remote meeting server 100 that has received the utterance information and the designation information transmits the utterance information to the member terminal 20 of the group A designated by the designation information. Then, the member terminal 20 that has received the utterance information outputs the utterance information.

Furthermore, in the remote lecture system 1, even when a comment is sent from the lecturer FC to the entire system, the comment may be sent on the basis of the information regarding the line of sight of the lecturer FC. For example, the lecturer FC moves the position of the pointer SP2, which is the line-of-sight pointer, into the region 52 written as the "overall comment", and utters the comment in a state where the "overall comment" is selected (feedback such as highlight of the frame of the region 52 is performed), so that the content is sent to the entire group.

Furthermore, for example, in the remote lecture system 1, in a case where the pointer SP2 is positioned in the "entire" frame, for example, in a case where the pointer SP2 is positioned in an area other than the areas AR1 to AR5, the voice of the lecturer FC is transmitted to the member terminals 20 of all the groups. Note that the above operation may be an operation as a touch panel.

1-9. System Example

Figure 25:
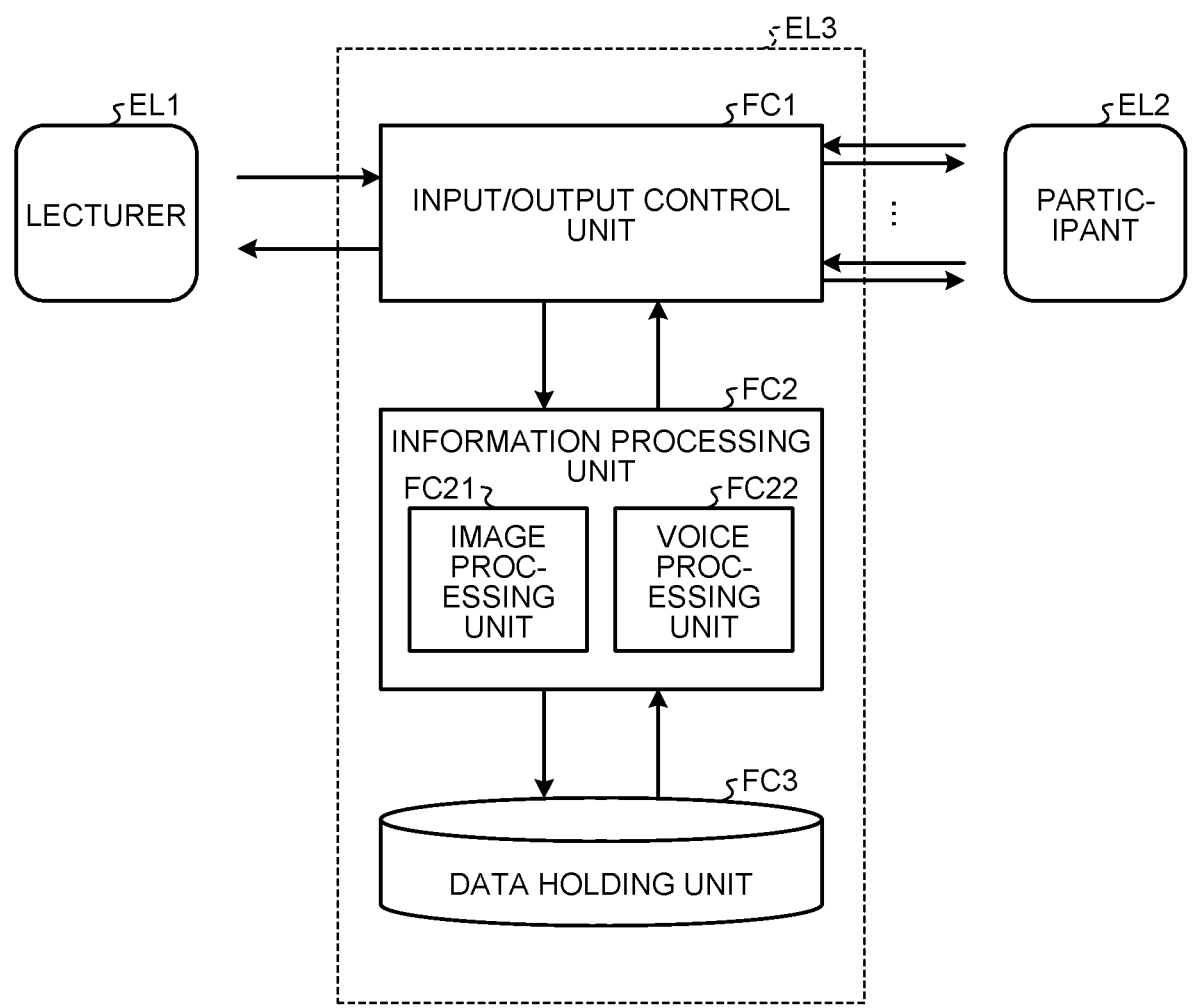
FIG. 25 is a diagram illustrating an example of components of a remote lecture system.

Here, components based on functions in the remote lecture system 1 will be conceptually described with reference to FIG. 25. FIG. 25 is a diagram illustrating an example of components of the remote lecture system. Note that the function of each element illustrated in FIG. 23 may be realized by any of various devices such as the remote meeting server 100, the terminal device 10, and the member terminal 20 included in the remote lecture system 1.

For example, the remote lecture system 1 includes three functional elements of a first element EL1, a second element EL2, and a third element EL3. The first element EL1 is an element corresponding to a lecturer (administrator), and its function is realized by the terminal device 10. Furthermore, the second element EL2 is an element corresponding to the participant (member), and the function thereof is realized by the member terminal 20.

The third element EL3 is an element corresponding to an entity that provides various services to the lecturer and the participant, and a function thereof is realized by the remote meeting server 100. The third element EL3 has three functions of an input/output control unit FC1, an information processing unit FC2, and a data holding unit FC3. The information processing unit FC2 includes an image processing unit FC21 and a voice processing unit FC22.

For example, the input/output control unit FC1 corresponds to the communication unit 110 of the remote meeting server 100, the information processing unit FC2 corresponds to the control unit 130 of the remote meeting server 100, and the data holding unit FC3 corresponds to the storage unit 120 of the remote meeting server 100. For example, the image processing unit FC21 and the voice processing unit FC22 correspond to the processing unit 132 of the control unit 130.

For example, the input/output control unit FC1 performs control for sending an image and audio input to the second element EL2 (system) and other information from a touch panel, a button, and the like to the information processing unit FC2, and performs control for presenting the information processed by the information processing unit FC2 to the system user.

For example, the information processing unit FC2 uses information from the input/output control unit FC1 to create data to be held and create information to be output. The image processing unit FC21 has a function of analyzing information such as eye lines, face movements, directions, and facial expressions of lecturers and participants. The voice processing unit FC22 has a function of removing noise from an input voice and converting waveform information into text information.

For example, image information and information such as a touch panel and a button are used for switching a display method for a system user and controlling input information. Furthermore, the information processing unit FC2 creates a keyword and a summary of contents from the utterance information converted into text. The information processing unit FC2 counts the number of times of the appeared keywords and performs classification based on the similarity of the summary contents, edits the keywords in an easy-to-understand form for the system user, and generates information to be output.

The information processing unit FC2 refers to the extracted keyword or summary content information and the information held in the data holding unit FC3, and creates information to be fed back to the system user. The extracted keyword and summary content information are divided on the side of the system user as a lecturer and on the side of a participant, and the respective data are sent to the data holding unit FC3. For example, the information of the keyword or the summary content extracted from the participant side is sent to the data holding unit FC3 together with the time information of the current time.

For example, the data holding unit FC3 holds information processed by the information processing unit FC2. Data on the lecturer side and extraction information on the participant side are held as time series data. The lecturer can correct the held data if there is an error in the summary content or the like through dialogue with the participants or a summary interview.

2. OTHER EMBODIMENTS

The processing according to each of the above-described embodiments may be performed in various different forms (modified examples) other than the above-described embodiments and modified examples.

2-1. Other Configuration Examples

In the remote lecture system 1 described above, the member terminal 20 or the terminal device 10 functions as a device that transmits information such as an utterance or an image of the user to the remote meeting server 100 and outputs information received from the remote meeting server 100, that is, a so-called thin client. As described above, in the above-described example, the remote lecture system 1 has been described as an example of a configuration of a so-called centralized system such as a client server system that executes main processing on the server side. Note that the above is merely an example, and any mode can be adopted for division of functions in the remote lecture system 1.

For example, in the remote lecture system 1 of the above-described example, the system configuration in which the remote meeting server 100 performs image processing and voice recognition has been described as an example, but the image processing and the voice recognition may be performed by each of the terminal device 10 and the member terminal 20. Furthermore, for example, the terminal device 10 may perform search processing of past comments, generation processing of assist information, and the like. In this case, the terminal device 10 functions as an information processing apparatus that outputs the plural group list information displaying the group content information in association with the corresponding group together with the plurality of groups. For example, the terminal device 10 holds information stored in the storage unit 120, and has functions of the processing unit 132, the extraction unit 133, and the generation unit 134. For example, the terminal device 10 functions as a rich client that performs processing related to voice recognition, information search (extraction), generation, and output (display). Then, the remote meeting server 100 collects information from the terminal device 10 and each member terminal 20, and provides necessary information to the terminal device 10 and each member terminal 20.

Furthermore, for example, in a case where the terminal device 10 and each member terminal 20 communicate or share information for providing a service related to a remote meeting between the terminal device 10 and each member terminal 20 according to a so-called peer to peer (P2P) mode, the remote lecture system 1 may not include the remote meeting server. In this manner, the remote lecture system 1 may execute main processing on the terminal (client) side of the user, for example, and the server may manage only information regarding the remote meeting or may have a system configuration not including the server, that is, a configuration of a so-called autonomous distributed system. As described above, the remote lecture system 1 may have either a centralized configuration or an autonomous distributed configuration.

Note that the configuration described above is an example, and the remote lecture system 1 may have any function division mode and any device configuration as long as it can provide the service related to the remote meeting described above.

2-2. Others

Furthermore, among the processes described in the above embodiments, all or part of the processes described as being performed automatically can be performed manually, or all or part of the processes described as being performed manually can be performed automatically by a known method. In addition, the processing procedure, specific name, and information including various data and parameters illustrated in the document and the drawings can be arbitrarily changed unless otherwise specified. For example, the various types of information illustrated in each drawing are not limited to the illustrated information.

Furthermore, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in an arbitrary unit according to various loads, usage conditions, and the like.

Furthermore, the above-described embodiments and modified examples can be appropriately combined within a range not contradicting processing contents.

Furthermore, the effects described in the present specification are merely examples and are not limited, and other effects may be provided.

3. EFFECTS ACCORDING TO THE PRESENT DISCLOSURE

As described above, the information processing apparatus (for example, in the embodiment, the remote meeting server 100 or the terminal device 10) according to the present disclosure includes the acquisition unit (the acquisition unit 131 or the acquisition unit 181 in the embodiment) and the output unit (the transmission unit 135 or the display unit 15 in the embodiment). The acquisition unit acquires group content information regarding the content of a conversation in at least one or more groups among a plurality of groups in which a plurality of users participating in a remote meeting are divided and can have a conversation in each group. The output unit outputs the plural group list information displaying the group content information in association with the corresponding group together with the plurality of groups.

As described above, the information processing apparatus according to the present disclosure outputs the plural group list information that displays the group content information in association with the corresponding group together with the plurality of groups, so that the information about the plural groups can efficiently be confirmed.

Furthermore, the output unit outputs assist information for making a comment to at least one or more groups among the plurality of groups. In this manner, the information processing apparatus can appropriately assist the dialogue by the group by outputting the assist information for making a comment to the group.

Furthermore, the output unit outputs information regarding comments made in the past as the assist information. In this manner, the information processing apparatus can appropriately assist the dialogue by the group by outputting the information regarding the comment made in the past.

Furthermore, the information processing apparatus includes an extraction unit (the extraction unit 133 in the embodiment). The extraction unit extracts a target comment from a history of comments made in the past. In this manner, the information processing apparatus can enable appropriate assistance based on the past comment by extracting the target comment from the history of the comments made in the past.

Furthermore, the extraction unit extracts the target comment corresponding to the target group on the basis of the information regarding the target group to be assisted. In this manner, the information processing apparatus can enable the assistance based on the appropriate past comment corresponding to the group by extracting the target comment corresponding to the target group to be assisted.

Furthermore, the extraction unit extracts the target comment by searching the history with the designated keyword. In this manner, the information processing apparatus can perform the assistance based on the appropriate past comment corresponding to the keyword by searching the history with the designated keyword and extracting the target comment.

Furthermore, the extraction unit extracts the target comment on the basis of the similarity between each comment in the history and the keyword. As described above, the information processing apparatus can extract the target comment on the basis of the similarity between each comment in the history and the keyword, thereby enabling the assistance based on the appropriate past comment corresponding to the keyword.

Furthermore, the output unit transmits the plural group list information to the terminal device. As described above, the information processing apparatus can efficiently check the information on the plurality of groups by transmitting the plural group list information to the terminal device.

Furthermore, the output unit transmits the plural group list information to the terminal device used by the administrator who manages the meeting. As described above, the information processing apparatus can efficiently check the information on the plurality of groups by transmitting the plural group list information to the terminal device used by the administrator who manages the meeting.

As described above, the terminal device (the terminal device 10 in the embodiment) according to the present disclosure includes the display unit (the display unit 15 in the embodiment). The display unit displays, together with a plurality of groups in which a plurality of users participating in a remote meeting are divided and can have a conversation in each group, plural group list information that displays group content information regarding a content of a conversation in at least one or more groups among the plurality of groups in association with a corresponding group.

As described above, the terminal device according to the present disclosure displays the plural group list information that displays the group content information in association with the corresponding group together with the plurality of groups, so that the information about the plurality of groups can efficiently be confirmed.

Furthermore, the terminal device includes an input unit (the voice input unit 12 or the operation unit 16 in the embodiment). The input unit receives an operation related to the group displayed in the plural group list information from the user who uses the terminal device. As described above, the terminal device can efficiently confirm the information about the plurality of groups by receiving the operation related to the group displayed in the plural group list information, and can improve the convenience for the user of the operation related to the group displayed in the plural group list information.

Furthermore, the display unit changes the display mode according to the operation of the user received by the input unit. In this manner, the terminal device can display appropriate information according to the operation by changing the display mode according to the operation of the user.

Furthermore, the display unit displays the assist information in a case where the input unit receives an operation of displaying the assist information to the user. In this manner, the terminal device can assist at an appropriate timing by displaying the assist information according to the operation of the user.

Furthermore, the display unit displays information regarding the past comment as the assist information. In this manner, the terminal device can appropriately assist the dialogue by the group by displaying the information regarding the comment made in the past.

Furthermore, in a case where an operation of changing the display mode of the group content information is received by the input unit, the display unit changes the display mode of the group content information. In this manner, the terminal device can display appropriate information according to the operation by changing the display mode of the group content information according to the operation of the user.

Furthermore, the terminal device includes a processing unit (the processing unit 184 in the embodiment). The processing unit executes processing according to the user's operation received by the input unit. As described above, by executing the processing according to the operation of the user, the terminal device can efficiently confirm the information on the plurality of groups, and can appropriately execute the processing according to the operation of the user.

Furthermore, in a case where an operation of giving a comment to at least one or more groups among the plurality of groups is received by the input unit, the processing unit executes processing of transmitting the comment to the group corresponding to the operation. As described above, in a case where the operation of giving a comment to the group is accepted, the terminal device can transmit the comment to the group at an appropriate timing by executing the process of transmitting the comment to the group corresponding to the operation.

Furthermore, in a case where an operation of giving a comment to all of the plurality of groups is received by the input unit, the processing unit executes processing of transmitting the comment to all of the plurality of groups. As described above, the terminal device can collectively transmit the comment to all of the plurality of groups by executing the processing of transmitting the comment to all of the plurality of groups.

4. HARDWARE CONFIGURATION

Figure 26:
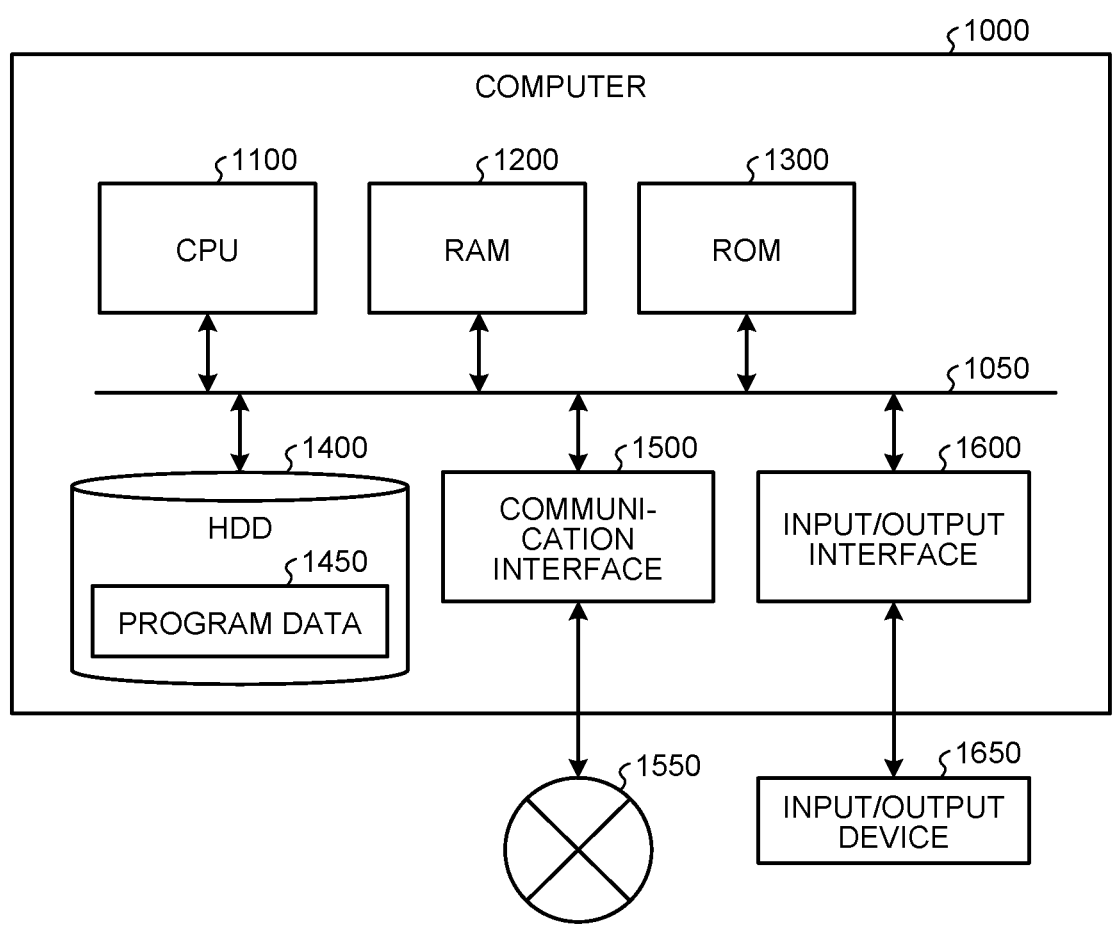
FIG. 26 is a hardware configuration diagram illustrating an example of a computer that implements functions of an information processing apparatus.

The information processing apparatus (information device) such as the remote meeting server 100 and the terminal device 10 according to each embodiment described above is realized by the computer 1000 having a configuration as illustrated in FIG. 26, for example. FIG. 26 is a hardware configuration diagram illustrating an example of the computer 1000 that implements the functions of the information processing apparatus. Hereinafter, the remote meeting server 100 according to the embodiment will be described as an example. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to connect to an external network 1550 (for example, the Internet). For example, the CPU 1100 receives data from other device or transmits data generated by the CPU 1100 to other device via the communication interface 1500.

The input/output interface 1600 is an interface for connecting an input/output device 1650 and the computer 1000. For example, the CPU 1100 receives data from an input device such as a keyboard and a mouse via the input/output interface 1600. Furthermore, the CPU 1100 transmits data to an output device such as a display, a speaker, or a printer via the input/output interface 1600. Furthermore, the input/output interface 1600 may function as a media interface that reads a program or the like recorded in a predetermined recording medium (media). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the remote meeting server 100 according to the embodiment, the CPU 1100 of the computer 1000 implements the functions of the control unit 130 and the like by executing the information processing program loaded on the RAM 1200. Furthermore, the HDD 1400 stores an information processing program according to the present disclosure and data in the storage unit 120. Note that the CPU 1100 reads the program data 1450 from the HDD 1400 and executes the program data 1450, but as another example, these programs may be acquired from another device via the external network 1550.

Note that the present technique can also have the following configurations.

(1)

An information processing apparatus comprising:
an acquisition unit that acquires group content information regarding a content of a conversation in at least one or more groups among a plurality of groups in which a plurality of users participating in a remote meeting are divided and can have a conversation in each group; and
an output unit that outputs plural group list information that displays the group content information in association with a corresponding group together with the plurality of groups.

(2)

The information processing apparatus according to (1), wherein the output unit outputs assist information for making a comment to at least one or more groups among the plurality of groups.

(3)

The information processing apparatus according to (2), wherein the output unit outputs information regarding comments made in a past as the assist information.

(4)

The information processing apparatus according to (3), comprising an extraction unit that extracts a target comment from a history of comments made in the past.

(5)

The information processing apparatus according to (4), wherein the extraction unit extracts, based on information regarding a target group to be assisted, the target comment corresponding to the target group.

(6)

The information processing apparatus according to (4) or (5), wherein the extraction unit extracts the target comment by searching the history with a designated keyword.

(7)

The information processing apparatus according to (6), wherein the extraction unit extracts the target comment based on a degree of similarity between each comment in the history and the keyword.

(8)

The information processing apparatus according to any one of (1) to (7), wherein the output unit transmits the plural group list information to a terminal device.

(9)

The information processing apparatus according to (8), wherein the output unit transmits the plural group list information to the terminal device used by an administrator who manages the meeting.

(10)

An information processing method of executing processing of:

acquiring group content information regarding a content of a conversation in at least one or more groups among a plurality of groups in which a plurality of users participating in a remote meeting are divided and can have a conversation in each group; and outputting plural group list information that displays the group content information in association with a corresponding group together with the plurality of groups.

(11)

A terminal device comprising a display unit that displays, together with a plurality of groups in which a plurality of users participating in a remote meeting are divided and can have a conversation in each group, plural group list information that displays group content information regarding a content of a conversation in at least one or more groups among the plurality of groups in association with a corresponding group.

(12)

The terminal device according to (11), comprising an input unit that receives an operation related to the group displayed in the plural group list information from a user who uses the terminal device.

(13)

The terminal device according to (12), wherein the display unit changes a display mode according to the operation of the user received by the input unit.

(14)

The terminal device according to (13), wherein the display unit displays, in a case where an operation of displaying assist information to the user is received by the input unit, the assist information.

(15)

The terminal device according to (14), wherein the display unit displays information regarding a past comment as the assist information.

(16)

The terminal device according to any one of (12) to (15), wherein the display unit changes a display mode of the group content information in a case where an operation of changing the display mode of the group content information is received by the input unit.

(17)

The terminal device according to any one of (12) to (16), comprising a processing unit that executes processing according to the operation of the user received by the input unit.

(18)

The terminal device according to (17), wherein the processing unit executes, in a case where an operation of giving a comment to at least one or more groups among the plurality of groups is received by the input unit, processing of transmitting a comment to the groups corresponding to the operation.

(19)

The terminal device according to (17) or (18), wherein the processing unit executes, in a case where an operation of giving a comment to all of the plurality of groups is received by the input unit, processing of transmitting a comment to all of the plurality of groups.

(20)

A display method of executing processing of:

acquiring, together with a plurality of groups in which a plurality of users participating in a remote meeting are divided and can have a conversation in each group, plural group list information that displays group content information regarding a content of a conversation in at least one or more groups among the plurality of groups in association with a corresponding group; and displaying the plural group list information.

REFERENCE SIGNS LIST

1 REMOTE LECTURE SYSTEM
100 REMOTE MEETING SERVER (INFORMATION PROCESSING APPARATUS)
110 COMMUNICATION UNIT
120 STORAGE UNIT
121 USER INFORMATION STORAGE UNIT
122 GROUP INFORMATION STORAGE UNIT
130 CONTROL UNIT
131 ACQUISITION UNIT
132 PROCESSING UNIT
133 EXTRACTION UNIT
134 GENERATION UNIT
135 TRANSMISSION UNIT
10 TERMINAL DEVICE (INFORMATION PROCESSING APPARATUS)
11 COMMUNICATION UNIT
12 VOICE INPUT UNIT (INPUT UNIT)
13 VOICE OUTPUT UNIT
14 CAMERA
15 DISPLAY UNIT
16 OPERATION UNIT (INPUT UNIT)
17 STORAGE UNIT
18 CONTROL UNIT
181 ACQUISITION UNIT
182 TRANSMISSION UNIT
183 RECEPTION UNIT
184 PROCESSING UNIT

The invention claimed is:

1. An information processing apparatus, comprising:
an acquisition unit configured to acquire, for each group of a plurality of groups, group content information associated with a content of a conversation, wherein
each group of the plurality of groups includes a plurality of users as participants of a remote meeting, and
the conversation in each group is associated with the plurality of users of a corresponding group of the plurality of groups;
a control unit configured to:
extract a plurality of keywords based on the acquired group content information of a first group of the plurality of groups; and
count a number of appearances of each keyword of the extracted plurality of keywords; and
an output unit configured to output plural group list information that includes the extracted plurality of keywords, the counted number of appearances of each keyword of the extracted plurality of keywords, and the acquired group content information of each group of the plurality of groups, wherein
the group content information of the first group of the plurality of groups is in association with the group content information of a second group of the plurality of groups.

2. The information processing apparatus according to claim 1, wherein
the output unit is further configured to output assist information, and
the acquisition unit is further configured to receive, based on the outputted assist information, a comment for at least one or more groups of the plurality of groups.

3. The information processing apparatus according to claim 2, wherein
the assist information includes a plurality of comments of a past, and
the plurality of comments includes the comment.

4. The information processing apparatus according to claim 3, further comprising an extraction unit configured to extract a target comment from the plurality of comments.

5. The information processing apparatus according to claim 4, wherein the extraction unit is further configured to extract, based on the acquired group content information of a target group of the plurality of groups, the target comment corresponding to the target group.

6. The information processing apparatus according to claim 4, wherein
the acquisition unit is further configured to acquire a specific keyword of the plurality of keywords, and
the extraction unit is further configured to:
search the plurality of comments based on the acquired specific keyword; and
extract the target comment based on the search of the plurality of comments.

7. The information processing apparatus according to claim 6, wherein
the control unit is further configured to calculate a degree of similarity between each comment of the plurality of comments and the acquired specific keyword, and
the extraction unit is further configured to extract the target comment based on the calculated degree of similarity between each comment of the plurality of comments and the acquired specific keyword.

8. The information processing apparatus according to claim 1, wherein the output unit is further configured to transmit the plural group list information to a terminal device.

9. The information processing apparatus according to claim 8, wherein the terminal device is associated with an administrator who manages the remote meeting.

10. An information processing method, comprising:
acquiring, for each group of a plurality of groups, group content information associated with a content of a conversation, wherein
each group of the plurality of groups includes a plurality of users as participants of a remote meeting, and
the conversation in each group is associated with the plurality of users of a corresponding group of the plurality of groups;
extracting a plurality of keywords based on the acquired group content information of a first group of the plurality of groups;
counting a number of appearances of each keyword of the extracted plurality of keywords; and
outputting plural group list information that includes the extracted plurality of keywords, the counted number of appearances of each keyword of the extracted plurality of keywords, and the acquired group content information of each group of the plurality of groups, wherein
the group content information of the first group of the plurality of groups is in association with the group content information of a second group of the plurality of groups.

11. A terminal device, comprising:
an acquisition unit configured to acquire, for each group of a plurality of groups, group content information associated with a content of a conversation, wherein
each group of the plurality of groups includes a plurality of users as participants of a remote meeting,
the conversation in each group is associated with the plurality of users of a corresponding group of the plurality of groups, the acquired group content information of a first group of the plurality of groups includes a plurality of keywords, and the acquired group content information of the first group further includes a count of number of appearances of each keyword of the plurality of keywords; and a display unit configured to:

display the acquired group content information of the first group of the plurality of groups in association with the acquired group content information of a second group of the plurality of groups; and display the count of the number of appearances of each keyword of the plurality of keywords in the acquired group content information of the first group.

12. The terminal device according to claim 11, further comprising an input unit configured to receive a first operation of an administrator of the remote meeting, wherein the administrator is associated with from a user who uses the terminal device, and the first operation corresponds to the first group.

13. The terminal device according to claim 12, wherein the display unit is further configured to change, based on the received first operation, a display mode of the acquired group content information of the first group.

14. The terminal device according to claim 13, wherein the acquisition unit is further configured to receive assist information, the input unit is further configured to receive a second operation, and the display unit is further configured to display, based on the received second operation, the received assist information.

15. The terminal device according to claim 14, wherein the assist information corresponds to a past comment.

16. The terminal device according to claim 12, further comprising a processing unit configured to execute a process based on the received first operation.

17. The terminal device according to claim 16, wherein the input unit is further configured to receive a second, and the processing unit is further configured to transmit, based on the received second operation, a comment to at least one or more groups of the plurality of groups.

18. The terminal device according to claim 16, wherein the input unit is further configured to receive a second, and the processing unit is further configured to transmit, based on the received second operation, a comment to each group of the plurality of groups.

19. A display method, comprising:

acquiring, for each group of a plurality of groups, group content information associated with a content of a conversation, wherein each group of the plurality of groups includes a plurality of users as participants of a remote meeting, the conversation in each group is associated with the plurality of users of a corresponding group of the plurality of groups, the acquired group content information of a first group of the plurality of groups includes a plurality of keywords, and the acquired group content information of the first group further includes a count of number of appearances of each keyword of the plurality of keywords;

displaying the acquired group content information of the first group of the plurality of groups in association with the acquired group content information of a second group of the plurality of groups; and displaying the count of the number of appearances of each keyword of the plurality of keywords in the acquired group content information of the first group.

* * * * *